United States Patent
Almadani et al.

(10) Patent No.: US 11,516,977 B1
(45) Date of Patent: Dec. 6, 2022

(54) SMART POT (S-POT): A HYDROPONIC SMART FLOWER VASE SYSTEM FOR ORNAMENTAL CROPS

(71) Applicant: KING FAHD UNIVERSITY OF PETROLEUM AND MINERALS, Dhahran (SA)

(72) Inventors: Basem Almadani, Dhahran (SA); Saud Mohammad Mostafa, Dhahran (SA); Farouq Muhammad Aliyu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/746,511

(22) Filed: May 17, 2022

Related U.S. Application Data

(60) Provisional application No. 63/292,116, filed on Dec. 21, 2021.

(51) Int. Cl.
*A01G 31/00* (2018.01)
*A01G 31/02* (2006.01)

(52) U.S. Cl.
CPC .................. *A01G 31/02* (2013.01)

(58) Field of Classification Search
CPC ........ A01G 31/00; A01G 31/02; A01G 31/06; A01G 2031/006; A01G 27/003; A01G 27/005; A01G 27/008; A01G 27/02; A01G 27/06
See application file for complete search history.

(56) References Cited

U.S. PATENT DOCUMENTS

| | | | | |
|---|---|---|---|---|
| 4,100,699 A | * | 7/1978 | Skaife | A01G 27/00 47/81 |
| 4,171,593 A | * | 10/1979 | Bigglestone | A01G 27/04 47/79 |
| 4,173,098 A | * | 11/1979 | Smith | A01G 27/00 47/84 |
| 4,270,309 A | | 6/1981 | Baumann | |

(Continued)

FOREIGN PATENT DOCUMENTS

| AU | 64567/94 | 12/1994 |
|---|---|---|
| IN | 201741028076 | 7/2018 |

*Primary Examiner* — Trinh T Nguyen
(74) *Attorney, Agent, or Firm* — Oblon, McClelland, Maier & Neustadt, L.L.P.

(57) ABSTRACT

A smart hydroponic vase system, a method for growing a plant in a smart hydroponic vase, and a method of assembling a smart hydroponic vas is described. The smart hydroponic vase includes a housing having a plurality of chambers; a submersible pump located in each of the plurality of chambers; a plurality of pipes, wherein each pipe connects a different chamber to the first chamber, wherein each pipe is connected to a respective submersible pump; a plurality of measurement sensors including ultrasonic level sensors and a temperature sensor, and a microprocessor connected to receive measurement signals and the level signals and generate drive signals to actuate the plurality of pumps based on sensor signals. A wireless communications unit is connected to the microprocessor. The smart hydroponic vase communicates with a plant manager through a server.

16 Claims, 16 Drawing Sheets

(56) References Cited

U.S. PATENT DOCUMENTS

| | | | | |
|---|---|---|---|---|
| 4,356,665 A * | 11/1982 | de Oliveira | ............ | A01G 27/04 |
| | | | | 47/80 |
| 5,168,664 A | 12/1992 | Deutschmann, Sr. | | |
| 5,394,647 A * | 3/1995 | Blackford, Jr. | ........ | A01G 31/02 |
| | | | | 47/62 A |
| 5,397,382 A * | 3/1995 | Anderson | ................ | F24F 8/10 |
| | | | | 47/65.5 |
| 5,555,676 A * | 9/1996 | Lund | ...................... | A01G 9/022 |
| | | | | 47/82 |
| 5,557,885 A | 9/1996 | Sledge | | |
| 5,826,374 A | 10/1998 | Baca | | |
| 5,860,247 A | 1/1999 | Newby | | |
| 7,171,783 B1 * | 2/2007 | Fidotti | ................... | A01G 27/04 |
| | | | | 47/81 |
| 7,516,574 B2 * | 4/2009 | Gottlieb | ................. | A01G 9/023 |
| | | | | 47/62 R |
| 8,225,549 B2 | 7/2012 | Simmons | | |
| 8,291,639 B2 * | 10/2012 | Gardner | ................. | A01G 31/02 |
| | | | | 47/60 |
| 8,484,890 B2 * | 7/2013 | Simmons | ............... | A01G 31/06 |
| | | | | 47/62 A |
| 8,621,782 B2 | 1/2014 | Buck et al. | | |
| 10,123,491 B2 | 11/2018 | De Fazio et al. | | |
| 11,304,390 B2 * | 4/2022 | Spiro | ...................... | A01G 31/06 |
| 2020/0037526 A1 * | 2/2020 | Sperry | ................... | A01G 9/025 |
| 2022/0061242 A1 * | 3/2022 | Sperry | ................... | A01G 31/06 |
| 2022/0132759 A1 * | 5/2022 | Hill | ...................... | A01G 27/005 |
| | | | | 47/62 N |
| 2022/0174890 A1 * | 6/2022 | Wantland | ............... | A01G 7/045 |

\* cited by examiner

SMART POT (S-POT): A HYDROPONIC SMART FLOWER VASE SYSTEM FOR ORNAMENTAL CROPS

CROSS REFERENCE TO RELATED APPLICATIONS

The present application claims the benefit of priority to U.S. Prov. App. No. 63/292,116, entitled "Smart Pot (S-Pot): A Hydroponic Smart Flower Vase System for Ornamental Crops", filed on Dec. 21, 2021, and incorporated herein by reference in its entirety.

BACKGROUND

Technical Field

The present disclosure is directed to a hydroponic smart flower vase system for ornamental crops.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Indoor gardening is the field of growing plants in an indoor space. Indoor gardening in homes, offices, and restaurants, may make an environment feel cheerful and improve work productivity. Ornamental crops may be grown in the indoor space, thereby eliminating the need for artificial ornamental plants that contribute to plastic pollution. Indoor-grown ornamental crops increase oxygen and act as a natural humidifier. However, managing ornamental indoor plants can be difficult for plant owners. For proper development of the indoor plants, constant monitoring of the requirements of the plants, such as water, nutrients, sunlight, and humidity level, is required. A plant owner or plant manager is required to check regularly for any insect manifestations or plant diseases, which can be time consuming.

To overcome such difficulties, hydroponics may be used to grow the indoor plants. Hydroponics is defined as a technique of growing plants without the use of soil. Hydroponics has been recognized as a method of producing vegetables (tomatoes, lettuce, cucumbers, and peppers). However, it also works well for growing ornamental crops such as herbs, roses, freesia, and foliage plants in a controlled environment. A hydroponics system is designed to deliver a nutrient solution periodically to the plant at a controlled and predictable rate. The delivery of the nutrient solution to the plant at the controlled rate causes accelerated plant growth within a limited space. For proper growth of the plant, it is required that the delivery of the nutrient solution to the root portions of the plant should neither exceed a required level, nor should the root portions be deprived of the nutrient solution. Hydroponic systems use 90% less water than traditional farming methods using soil. Overwatering or underwatering of the plant may lead to plant death. Therefore, the plant manager must have sufficient knowledge regarding irrigation and other requirements of the plant. Some plants are sensitive to the potential of hydrogen (pH) of the solution, and some plants require a minimum amount of sunlight, which varies with the species of the plant. Further, aeration of the plant roots is also necessary for the growth of the plant. In conventional hydroponic systems, the plants must be continually monitored and action must be taken based on the observations. Therefore, the knowledge of the plant manager can also be factor in the growth of the plant.

Other factors, such as checking the status of the nutrient solution and filling the solutions periodically, increase the labor requirements of the plant manager. Additionally, conventional hydroponic systems require external reservoirs to deliver the nutrient solution, thereby providing complex, huge, and costly hydroponic systems.

Hence, there is a need for hydroponic system that can provide essential nutrient solutions to the plants in an effective manner for the growth of the plants, which reduces the burden of physical monitoring of the plant and knowledge needed by the plant manager, and which provides the advantage of remote monitoring.

SUMMARY

In an exemplary embodiment, a smart hydroponic vase system is described. The system includes an elongated housing having an open end and a closed end, wherein the open end has a greater diameter than the closed end; a plurality of chambers within the elongated housing, the plurality of chambers including at least a first chamber, a second chamber located beneath the first chamber, a third chamber located beneath the second chamber, and a fourth chamber located beneath the third chamber; a plurality of submersible pumps, wherein a submersible pump is located in each of the plurality of chambers; a plurality of pipes, wherein each pipe connects a different one of the second, the third, and the fourth chamber to the first chamber, wherein each pipe is connected to a respective submersible pump; a plurality of measurement sensors located in the first chamber, wherein each measurement sensor is configured to generate measurement signals; a plurality of ultrasonic level sensors, wherein each chamber includes an ultrasonic level sensor, wherein each ultrasonic level sensor is configured to measure a level of a respective fluid in said each chamber and generate a level signal; a microprocessor attached to an exterior wall of the first chamber, wherein the microprocessor is connected to the plurality of measurement sensors, the plurality of ultrasonic level sensors, and the plurality of submersible pumps, wherein the microprocessor is configured to receive the measurement signals and the level signals and generate drive signals to actuate the plurality of pumps based on the measurement signals and the level signals; and a wireless communications unit connected to the microprocessor.

In another exemplary embodiment, a method for growing a plant in a smart hydroponic vase includes at least four chambers, each chamber including a fluid. The method includes receiving, by a microprocessor, a plurality of measurement signals from measurement sensors located in a first chamber, a plurality of level signals, each level signal received from an ultrasonic level sensor located in each chamber, a location signal from a GPS unit operatively connected to the microprocessor, at least one image of the plant from a camera located on an exterior of the smart hydroponic vase, a rechargeable battery charge level from a rechargeable battery located in a base of the smart hydroponic vase. The method includes storing contact information of a manager of the plant in a memory of the microprocessor. The method further includes receiving records regarding plant requirements and images of plant conditions related to a genus and species of the plant by a wireless communications unit operatively connected to the microprocessor. The method further includes monitoring the plurality of measurement signals and the plurality of level signals by the microprocessor. The method further includes determining by the microprocessor whether the plurality of measurement signals match the plant requirements. The method further includes when the plurality of measurement signals match the plant requirements, continuing to monitor the plurality of measurement signals. The method further includes when the plurality of measurement signals do not match the plant requirements, generating drive signals to actuate a plurality of submersible pumps, wherein each chamber includes one submersible pump immersed in the fluid of the respective chamber. The method further includes conveying, through a piping system connected to each submersible pump in a second chamber, a third chamber and a fourth chamber, each fluid of each respective chamber to the first chamber. The method further includes mixing the fluids from the second chamber, the third chamber and the fourth chamber in the first chamber. The method further includes spraying, by a spray nozzle connected to a submersible pump immersed in the fluid of the first chamber, a root ball of the plant. The method further includes continuing to monitor the plurality of measurement signals unit the plurality of measurement signals match the plant requirements.

In another exemplary embodiment, a method of assembling a smart hydroponic vase is described. The method includes forming an elongated housing having an open end and a closed end, wherein the open end has a greater diameter than the closed end, wherein forming the elongated housing includes connecting a plurality of chambers, each having a closed lower end and an open upper end, to one another; placing a submersible pump into each chamber; connecting a pipe to each submersible pump below a top chamber; threading the respective pipe of each chamber into a through hole in a floor of each chamber above the respective chamber until the respective pipe enters an access hole in a top chamber; connecting an ultrasonic level sensor to an underside of each floor; filling each chamber below the first chamber with a respective fluid, wherein the respective fluid is one of water, a pH positive fluid, a pH negative fluid, a liquid fertilizer, and a liquid insecticide; connecting a nozzle to the submersible pump in the top chamber; placing a temperature sensor on the floor of the first chamber; placing a pH sensor on the floor of the first chamber; placing a humidity sensor on a wall of the first chamber; placing a cover over the first chamber, wherein the cover includes a center hole, wherein the center hole is configured to support a stem of a plant such that a root system of the plant is within the first chamber and a body of the plant exits the cover through the center hole; connecting an ultrasonic level sensor to an underside of the cover; connecting a camera to an exterior of the housing, wherein the camera is configured to take images of the body of the plant; connecting the floor of a lowest chamber to a base; inserting a rechargeable battery in the base; placing a microprocessor on an exterior of the first chamber, near the cover, wherein the microprocessor includes a plurality of connection ports, a GPS unit and a wireless communications unit; routing wiring from each submersible pump, each level sensor, the temperature sensor, the pH sensor, and the humidity sensor through the pipes and through a wiring aperture in a wall of the first chamber, wherein the wiring aperture is located beneath the microprocessor; sealing the wiring aperture around the wiring and the microprocessor with a seal; connecting each wiring from each submersible pump, each level sensor, the temperature sensor, the pH sensor, and the humidity sensor to the plurality of connection ports of the microprocessor such that each wiring connects to a different one of the plurality of connection ports; connecting a wire from the camera and a wire of the rechargeable battery to camera connection port and a battery connection port, respectively, of microprocessor; and establishing communications, by the wireless communications unit, with a server through a wireless access node, wherein the server is configured to transmit a plant status message to a plant manager.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
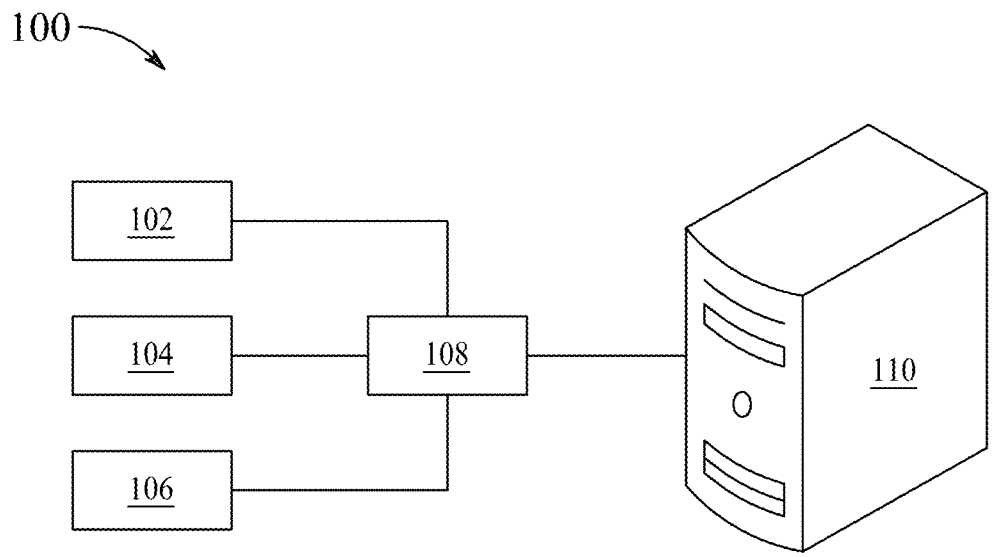
FIG. 1A illustrates a network diagram of a smart hydroponic vase system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a smart hydroponic vase system, a method for growing a plant in a smart hydroponic vase, and a method of assembling the smart hydroponic vase. The smart hydroponic vase includes a microprocessor connected to a plurality of sensors and a plurality of pumps for regulating the environment within the smart hydroponic vase. The microprocessor is configured to receive sensor data from the plurality of sensors. Also, the microprocessor is operatively connected to a GPS unit, which is attached to the smart hydroponic vase and receives the location coordinates of the smart hydroponic vase from the GPS unit. The microprocessor is configured to generate a communications packet including sensor data and the location coordinates. A communications unit is communicably coupled to the microprocessor to receive the generated communications packet. The communications unit further transfers the received packet to a server/remote monitoring center via a wireless access node using an IoT protocol.

Figure 1B:
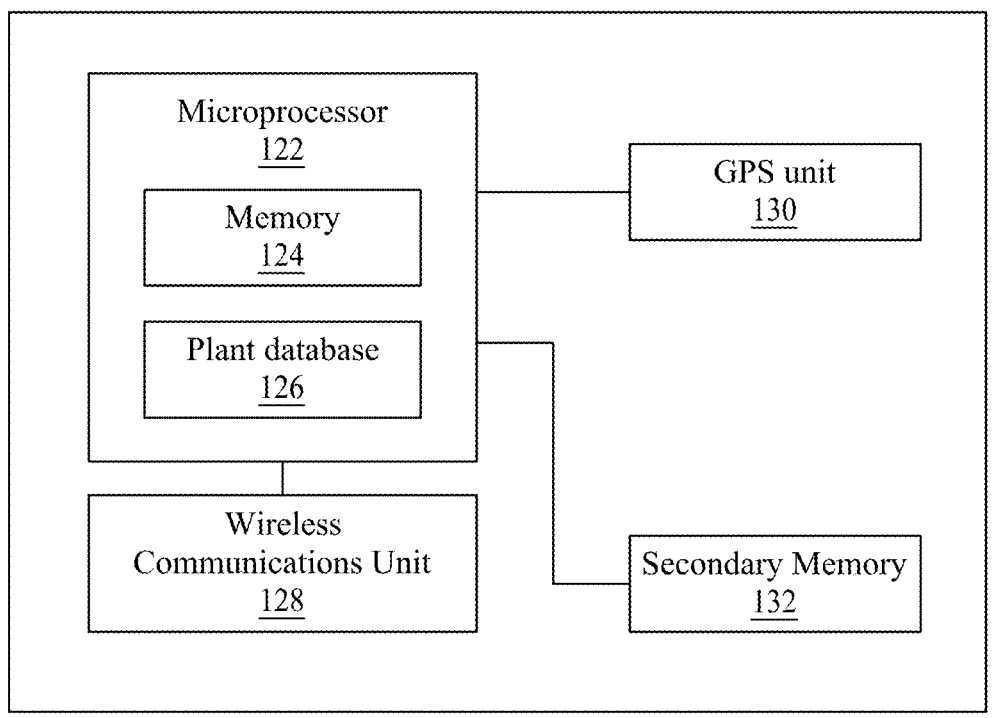
FIG. 1B illustrates connections of various components of a smart hydroponic vase, according to certain embodiments.
Figure 1C:
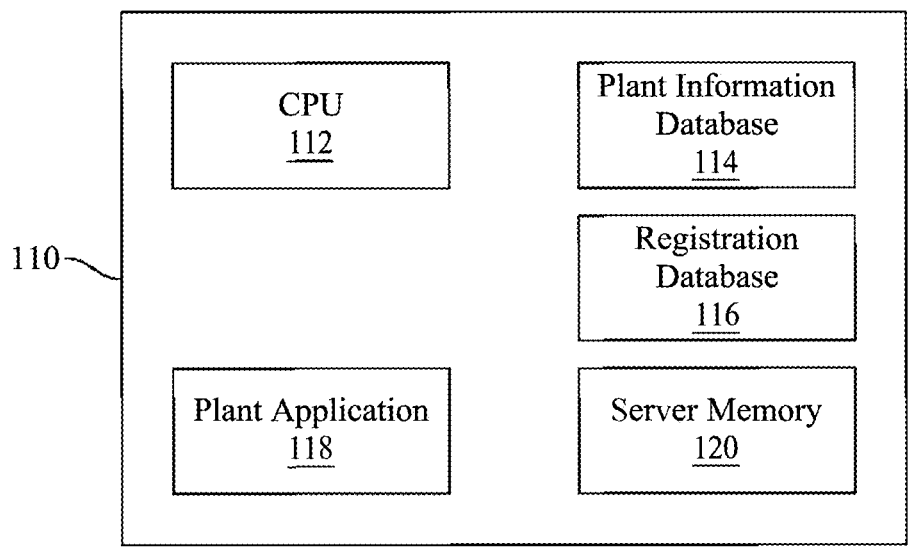
FIG. 1C illustrates a block diagram of a server, according to certain embodiments.

FIGS. 1A-1C illustrate an overall configuration a smart hydroponic vase system 100.

FIG. 1A illustrates a network diagram of a smart hydroponic vase system 100 (hereinafter interchangeably referred to as "the system 100"), according to one or more aspects of the present disclosure. The system 100 includes a plurality of smart hydroponic vases (102, 104, 106), a wireless access node 108, and a server 110.

Each of the plurality of smart hydroponic vases (102, 104, 106) is configured to grow at least one plant therein and also configured to monitor the growth of the plant. Each of the smart hydroponic vases (102, 104, 106) includes an elongated housing, a microprocessor 122, a plurality of measurement sensors, a plurality of ultrasonic level sensors, and a plurality of submersible pumps. The plurality of measurement sensors, the plurality of ultrasonic level sensors, and the plurality of submersible pumps are enclosed in the elongated housing. The elongated housing is divided into a plurality of chambers. Each chamber is configured to store/contain at least one nutrient or water or a mix of both. Each chamber has at least one submersible pump and at least one ultrasonic level sensor. Each smart hydroponic vase (102, 104, 106) has a unique identification (ID) number. The plurality of measurement sensors is configured to generate a plurality of measurement signals (sensor data) by measuring a plurality of parameters associated with the smart hydroponic vase (102, 104, 106). Further, each of the plurality of ultrasonic level sensors is configured to measure a level of a respective fluid in each chamber and generate a level signal. The smart hydroponic vase (102, 104, 106) includes a GPS unit that is configured to receive location coordinates of the smart hydroponic vase. In some aspect, the smart hydroponic vase (102, 104, 106) includes a secondary memory 132 that is configured to store parameters or predefined settings required during resetting or rebooting of the smart hydroponic vase 102.

As shown in FIG. 1B, the microprocessor 122 includes a memory 124 and a plant database 126. The memory 124 is configured to store contact information of a plant manager. The plant database 126 includes information relating to a genus of the plant, a species of the plant, an age of the plant, plant requirements, and images of plant conditions. The plant database 126 may store images of healthy plants and images of unhealthy plants.

The microprocessor 122 is operatively connected to a GPS unit 130 to receive the location coordinates of the smart hydroponic vase. Further, the microprocessor 122 is communicably coupled to a wireless communications unit 128 that provides a connectivity between the microprocessor 122 and the wireless access node 108. The wireless communications unit 128 has at least one antenna for transmitting and receiving communications packets or records to/from the server 110 via the wireless access node 108. In some examples, at least one antenna is a near field antenna, a WiFi antenna, and a radio frequency antenna. The wireless communications unit 128 may include a wireless-frequency transceiver having a variable gain amplifier that generates radio-frequency signals for transmission. A wireless amplifier circuit may be used to amplify the radio-frequency signals at the output of the variable gain amplifier for transmission through a plurality of antennas.

The microprocessor 122 is communicably coupled to the plurality of sensors and receives the generated sensor data from the plurality of sensors. The microprocessor 122 is configured to determine whether the generated plurality of measurement signals matches the plant requirements. When the plurality of measurement signals does not match the plant requirements, the microprocessor 122 is configured to generate a plurality of drive signals to actuate or adjust the operation of the plurality of submersible pumps.

The microprocessor 122 associated with each of the smart hydroponic vases (102, 104, 106) is configured to determine the requirements of the plant grown within said vase by comparing the received sensor signals (measurement signal and level signal) with a record corresponding to said grown plant fetched from the plant database 126. For example, the plant requirements may be a specific amount of water to be sprayed on the plant, a predefined pH level, a predefined humidity level, a predefined temperature, a predefined lighting, a predefined nutrient level, and a predefined fertilizer level. The microprocessor 122 performs data processing, analysis, classification and makes control action decisions for the smart hydroponics vase, thereby eliminating the load on the server 110, reducing the amount of data to be transferred to the server 110 and reducing the latency in the overall network.

Further, the smart hydroponic vase (102, 104, 106) is configured to provide water and other essential nutrients to the plant according to the determined plant's requirements, thereby providing a suitable environment for ideal growth. The stored nutrients or water may be pumped using the plurality of submersible pumps, one located in each of the plurality of chambers, to a root level chamber. The root level chamber is configured to mix the pumped nutrients and water to generate a nutrient mixture/solution. Further, a pump in the root level chamber is configured to spray the nutrient mixture onto the roots of the plant.

As shown in FIG. 1C, the server 110 includes a central processing unit ("CPU", "processor" and "computer processor" herein) 112, a plant information database 114, a registration database 116, a plant application 118, and a memory 120. In an aspect, the server 110 is an application server. In some examples, the server 110 is a server operating system, such as Windows Server or Linux, which acts as the platform that enables applications to run.

In an example, the server 110 can be implemented as one or more microprocessors, microcomputers, microcontrollers, digital signal processors, state machines, logic circuitries, and/or any devices that manipulate signals based on operational instructions. Among other capabilities, the server 110 is configured to fetch and execute the predetermined set of instructions stored in the memory 120. In some examples, the server 110 may be implemented as any type of computing device for hosting a webpage or website accessible via the network, such as, but without limitation, a web server, application server, cloud server, or other host. For example, the server 110 acts as a management server that is capable of performing data communication with respect to the smart vase (s). The management server provides access to the hardware resources that are required for establishing network connectivity.

In an operative aspect, the plant manager may register the smart hydroponic vase 102 with the server 110 using the plant application 118 during the propagation of the plant in the smart hydroponic vase using a registration interface. In an example, the plant manager may download and install the plant application 118 on a user device. The registration interface of the plant application 118 may be configured to seek the plant manager to create a profile by providing personal information such as name, age, address, contact number and like so. In some examples, the plant application 118 is configured to analyze the email, message, profile information and/or other information to obtain the personal information. In some examples, the plant application 118 may be a software application or a mobile application specifically designed for plant management of the smart hydroponics vase and provided by an application distribution platform. Examples of plant application 118 distribution platforms include the App Store for iOS provided by Apple, Inc., Play Store for Android OS provided by Google Inc., and such application distribution platforms. In one aspect, the growth of the plant in the smart hydroponic vase may be controlled using the user device through the plant application 118.

In some examples, the user device includes communication capabilities (e.g., through cellular, Bluetooth, hotspot and/or Wi-Fi), allowing communication with other devices and/or a centralized server. For example, and without limitation, the smartphone may refer to a mobile device, PDA, desktop computer, GPS device, automotive navigation system, wearable object, a cellular telephone, a tablet, a netbook, a wireless terminal, a laptop computer, a wearable computer device, or any other device.

The CPU 112 is configured to execute a sequence of machine-readable instructions, which may be embodied in a program or software. The instructions may be stored in a memory location, such as the memory 120. The instructions can be directed to the CPU 112, which may subsequently program or otherwise configure the CPU 112 to implement methods of the present disclosure. In some example, the CPU 112 is configured to control and/or communicate with large databases, performing high volume transaction processing, and generating reports from large databases. For example, the CPU 112 may include a conventional microprocessor. In some examples, the CPU 112 may be a single core or multi core processor, or a plurality of processors for parallel processing.

The plant information database 114 is configured to store a plurality of unique IDs corresponding to the plurality of smart hydroponic vases, store a plant profile corresponding to each of unique ID. The plant profile includes various details about the plants grown in each smart hydroponic vase such as plant name, date of planting, essential parameters for proper growth of the plant such as water requirements, nutrient requirements, sunlight requirement, required fertilizer, location of the vase, etc. The plant information database 114 is configured to store a plurality of the records including genus of the plant and the species of the plant along with the plant requirements. The essential parameters may be configured to change according to the plant's stage of life and the surrounding environment of the plant.

The registration database 116 is configured to store the profile of the plant manager corresponding to each smart vase having personal information of the owner of the plant registered with the server 110. In an example, each profile is assigned with a unique number. The stored profile of the plant manager includes name, age, contact, number, location, and details of other smart vases owned by the plant manager.

Any database discussed herein may include relational, hierarchical, graphical, or object-oriented structures and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), MySQL, or any other suitable database product. Moreover, the databases may be organized in any suitable manner, for example, as data tables or lookup tables. Each record may be a single file, a series of files, a linked series of data fields, or any other data structure. An association of various data may be accomplished through any desired data association techniques such as those known or practiced in the art.

The database may be web-based (also referred to as cloud-based) and be controlled via a web-based interface. For example, the web-based interface databases include a MICROSOFT ACCESS web application on a MICROSOFT SHAREPOINT site, a virtual machine server such as AMAZON S3, MICROSOFT Azure hosting an instance of an SQL Server, or an ORACLE or SAP Software as a Service (SaaS) on the mobile device.

The memory 120 is configured to store various types of data or information during the processing of the various activities, such as communication between the CPU 112 and the plant application 118. The memory 120 is configured to store a set of growth instructions corresponding to each of the plant. In an example, the memory 120 is a random access memory ("RAM") for temporary storage of information and/or a read only memory ("ROM") for permanent storage of information, and a mass storage device, such as a hard drive, diskette, or optical media storage device.

In an aspect, the plant manager may download a set of growth instructions (GI) in the smart hydroponic vase 102 from the server 110 corresponding to the genus of the grown plant in the hydroponic vase 102. The hydroponic vase 102 is configured to adapt to an environment according to the downloaded set of growth instructions (GI). In some examples, the hydroponic vase 102 and the server 110 are configured to receive Growth Instructions (GI) from the plant manager and the adapt the smart vase based on the received GI and crop/plant grown.

The microprocessor 122 is configured to generate a communications packet that includes information such as contact information of the plant manager, the plurality of measurement signals, the plurality of level signals, and so on. Each of the plurality of smart hydroponic vases (102, 104, 106) is configured to communicate with the server 110 via the wireless access node 108. The microprocessor 122 communicates the generated communications packet to the wireless access node 108 using the wireless communications unit 128. The microprocessor 122 is also configured to transmit the genus of the plant and the species of the plant, fetched from the plant database 126, to the server 110 via the wireless communications unit 128.

The wireless access node 108 is configured to transfer the received communications packet to the server 110. The wireless access node 108 serves as a connection or medium for the plurality of smart hydroponic vases (102, 104, 106) to gain access to the Internet or to other devices in a network. In an example, the wireless access node 108 is selected from a group including Node B, eNodeB, radio network controller ("RNC"), base station ("BS"), radio base station ("RBS"), base station controller ("BSC"), transmission/reception base station ("BTS"), transceiver function ("TF"), wireless transceiver, wireless router, basic service set ("BSS"), extended service set ("ESS"), or some other similar term, either as may be implemented or known as either.

As shown in FIG. 1A, the server 110 receives the communications packets from the wireless access node 108 and analyzes the received communications packets. Further, the server 110 is configured to extract the various details such as unique ID, values of the plant's requirements, state of the plant, and current location of the vase from the received packets. After extracting the various details, the server 110 is configured to compare the extracted plants requirements with the values corresponding to the essential parameters fetched from the plant information database 114. The server 110 is configured to match the genus of the plant and the species of the plant to the record of plant requirements and plant conditions. Based on the comparison result, the server 110 is configured to retrieve the matched record corresponding to each smart vase and to transmit the generated record to the smart hydroponic vase via the wireless access node 108. The microprocessor 122 is configured to update the plant database 126 with the record received from the server 110.

The server 110 is also configured to communicate with the plant manager. If the extracted value of the plants requirements does not match with the expected value, the server 110 generates the plant status message and send the generated message to the plant manager. For example, the server 110 may obtain a value of humidity level of the plant to be 12%, whereas the fetched value from the plant information database 114 corresponding to said plant is 18%. Based on the comparison, the server 110 sends a plant status message to the plant manager indicating "humidity level is low" and simultaneously sends the record to the microprocessor of the smart vase indicating the required humidity level of the plant.

Further, the server 110 compares the current location of the smart vase with the location stored with the plant profile fetched from the registration database 116. If the location has been changed, the server 110 is configured to update the location of the smart vase in the registration database 116 and also determine the environmental parameters associated with the new location of the smart vase. Based on the updated location, the server 110 is configured to generate a record corresponding to each smart vase and to transmit the generated record to the smart hydroponic vase via the wireless access node 108.

Figure 1D:
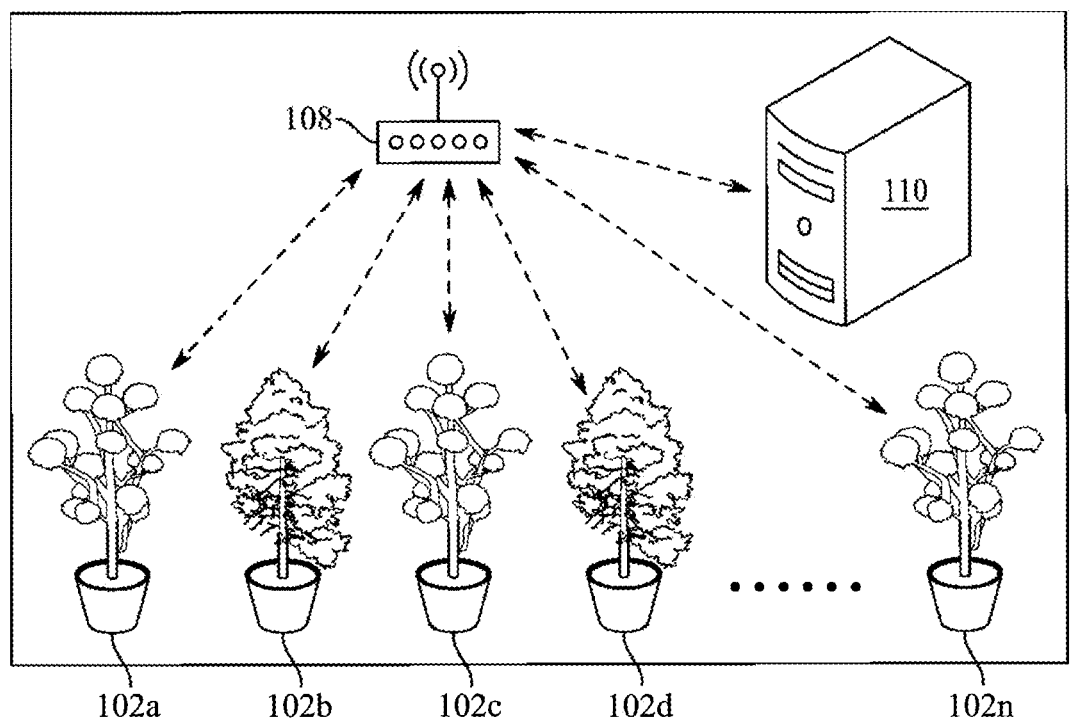
FIG. 1D illustrates a practical implementation of a smart hydroponic vase system, according to certain embodiments.

FIG. 1D illustrates a practical implementation of the smart hydroponic vase system 100, according to certain embodiments. As shown in FIG. 1D, the plurality of smart hydroponics vases (102a, 102b. 102c, . . . , 102n) is communicating to the server 110 via the wireless access node 108.

Figure 1E:
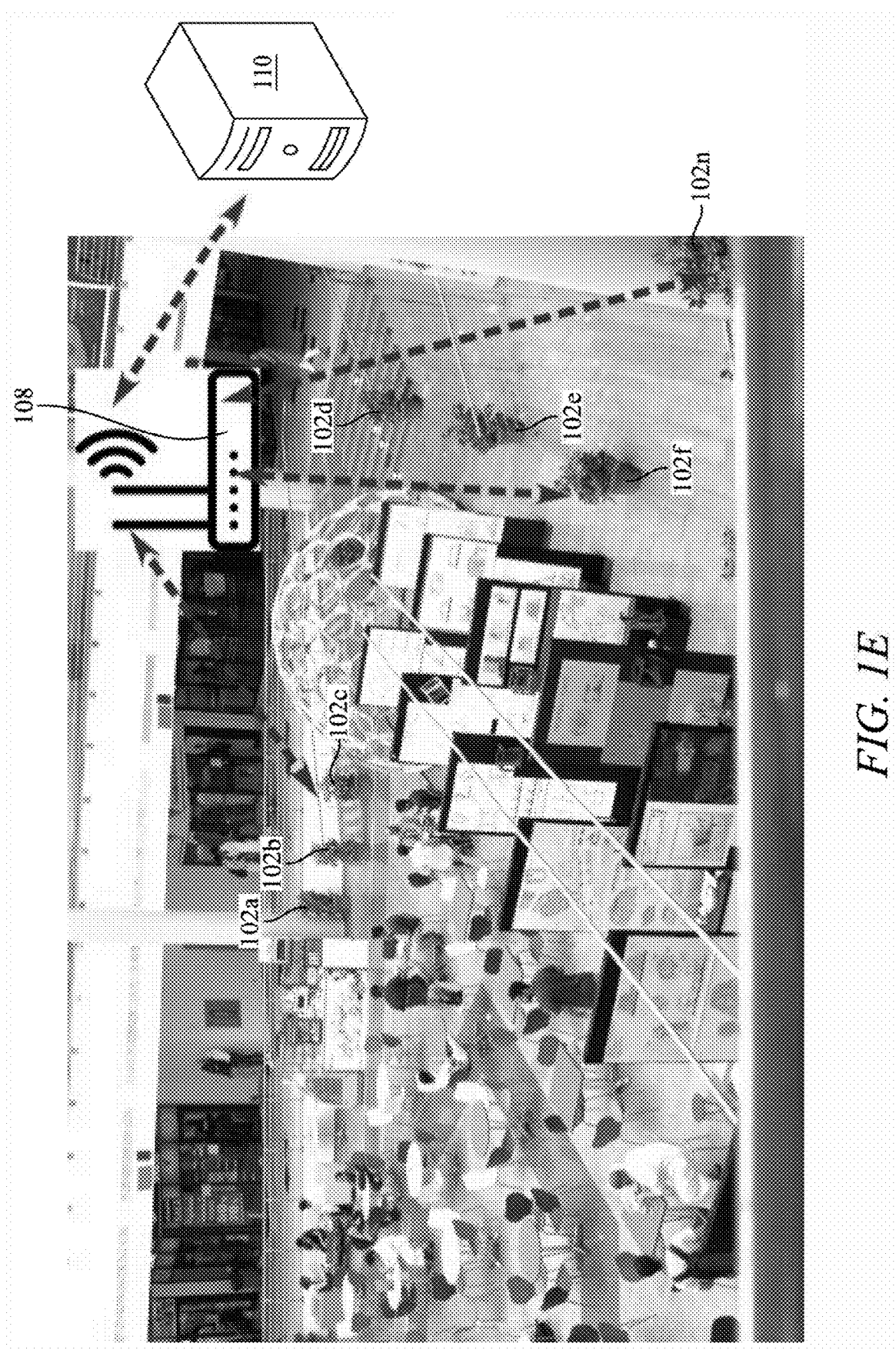
FIG. 1E illustrates a real world application of the smart hydroponic vase system, according to certain embodiments.

FIG. 1E shows a real world application of the smart hydroponic vase system in which planted smart hydroponic vases (102a, 102b, 102c, 102d, . . . , 102n) are arranged in a shopping mall. The smart hydroponic vases (102a, 102b, 102c, 102d, . . . , 102n) are each connected to the server 110 by the wireless access node 108.

Figure 2:
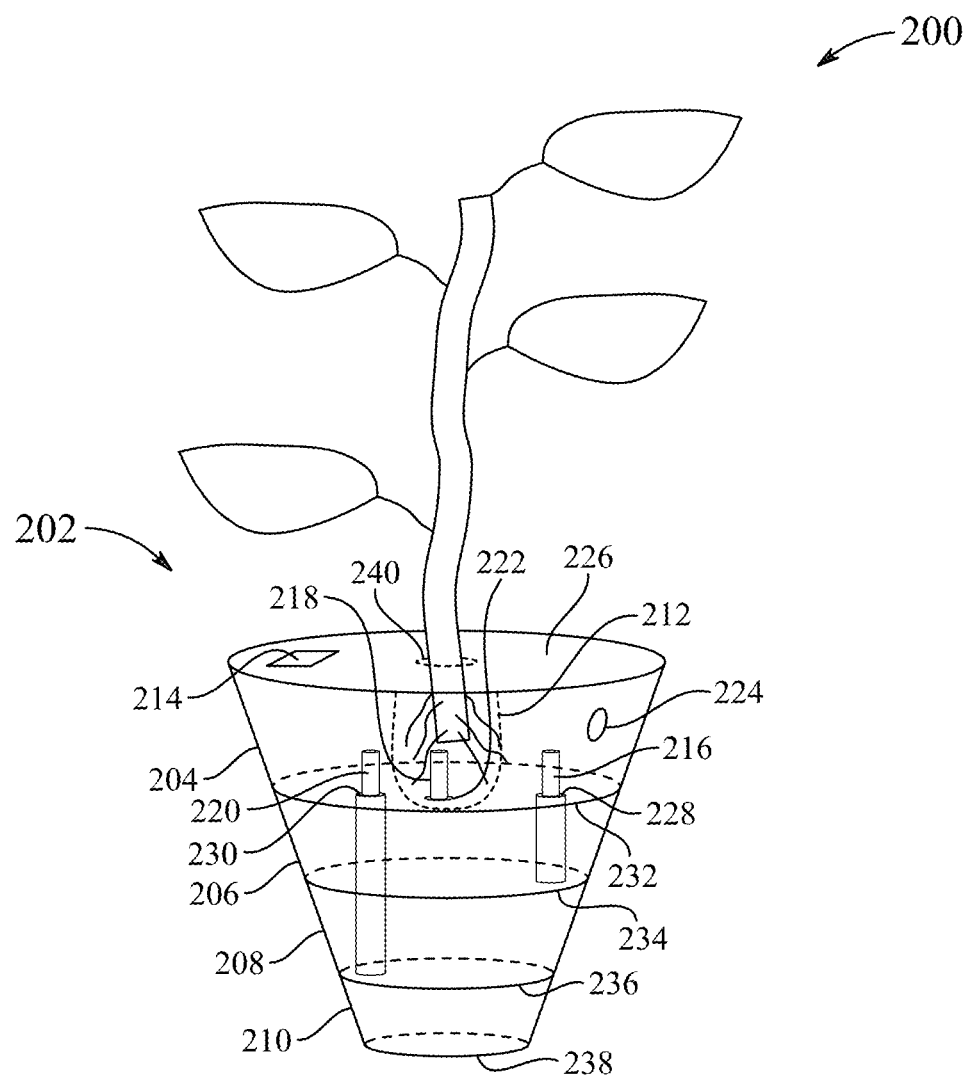
FIG. 2 illustrates an exemplary representation of a smart hydroponic vase, according to certain embodiments.

FIG. 2 illustrates an exemplary representation of a smart hydroponic vase 200, according to certain embodiments. The smart hydroponic vase 200 includes inter alia an elongated housing 202, a plurality of chambers (204, 206, 208, 210), a plurality of submersible pumps (not shown), a plurality of pipes (216, 218, 220), a plurality of measurement sensors (not shown), a plurality of ultrasonic level sensors (not shown in FIG. 2), a microprocessor (not shown), and a wireless communications unit (not shown in FIG. 2).

The elongated housing 202 has an open end and a closed end. The open end has a greater diameter than the closed end. For example, but not by way of limitation, the elongated housing 202 of the present invention may be square, rectangular, oval, round, elliptical, triangular, hexagonal, or octagonal shapes, or any other polygonal shape, or any combination of such shapes. The elongated housing 202 is made of material that is rust-free, or non-rusting, corrosion-resistant and/or acid-resistant. The elongated housing 202 may be made of plastic, an insulating material, or metal, such as galvanized steel.

The elongated housing 202 includes the plurality of chambers (204, 206, 208, 210). The plurality of chambers includes inter alia at least a first chamber 204, a second chamber 206, a third chamber 208 and a fourth chamber 210. In a structural implementation, the second chamber 206 is located beneath the first chamber 204, and the third chamber 208 is located beneath the second chamber 206. Further, the fourth chamber 210 is located beneath the third chamber 208. In FIG. 2, for example, four chambers (204, 206, 208, 210) are shown in the elongated housing 202, however, there can be more than the four chambers (204, 206, 208, 210) in the elongated housing 202.

The elongated housing 202 includes a cover 226. The cover 226 is connected to a mouth of the first chamber 204. The cover 226 has a center hole 240, shown in FIG. 2 as the central region of the cover 226 where the plant stem extends through the cover, and an air vent 214. The center hole 240 is configured to support a stem of the plant such that a root system of the plant is within the first chamber 204 and a body of the plant exits the cover 226 through the center hole. The air vent 214 is located in the cover 226 between the center hole 240 and a perimeter of the cover 226. The cover 226 is configured to hold the plant. In an example, the cover 226 is made of styrofoam that is strong enough to hold the plant, but not too strong to destroy the stem. Further, the styrofoam layer is light in weight and easy to install and move, thereby yielding a lightweight smart hydroponic vase 200.

Figure 3:
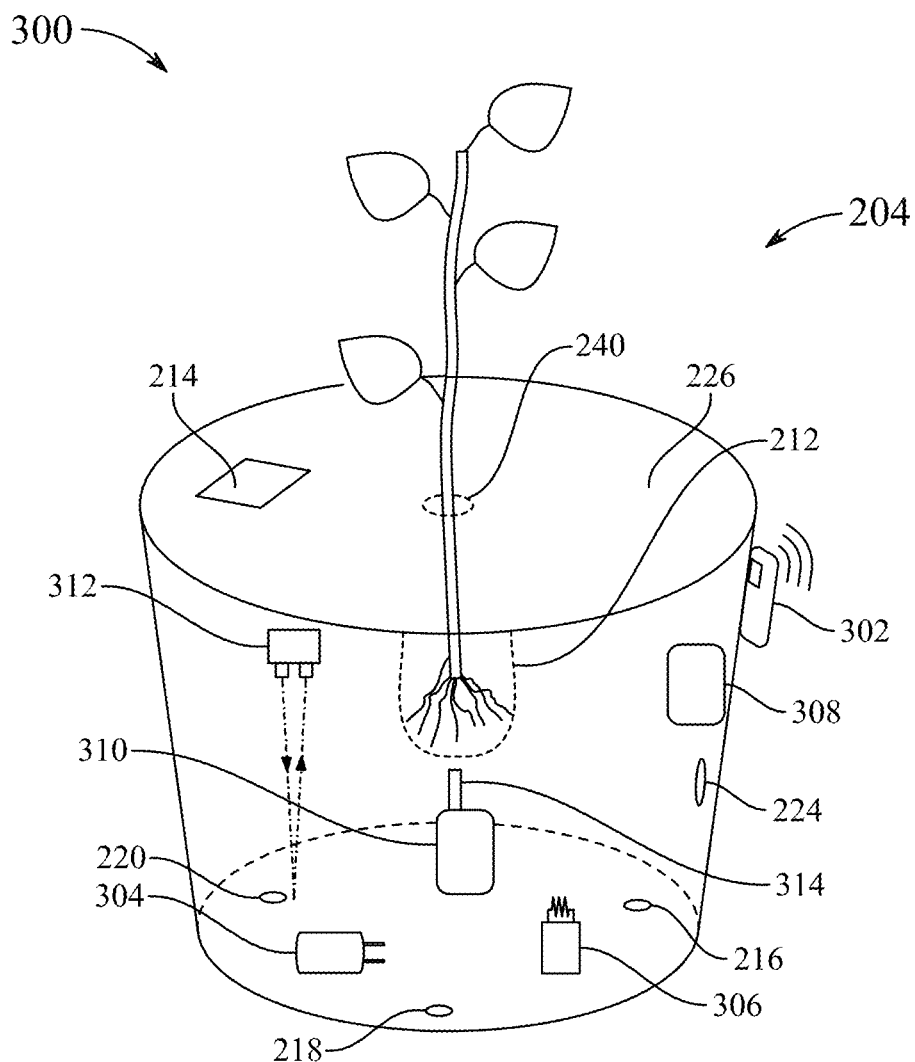
FIG. 3 illustrates a front view of a root zone of the smart hydroponic vase, according to certain embodiments.

Each of the chambers (204, 206, 208, 210) includes an ultrasonic level sensor (shown as 312 in FIG. 3). The ultrasonic level sensor is configured to measure a level of a respective fluid in said each chamber and generate a level signal.

The first chamber 204 includes a root zone 212 between the cover 226 and a first floor 232 of the first chamber 204. The root zone 212 is configured to provide access to air, water, and nutrients to the plant's roots. The root zone 212 is configured to receive nutrients pumped by the plurality of submersible pumps located in the different levels/chambers. In addition, the root zone 212 is configured to provide oxygen to the roots through the air vent 214. The first floor 232 is located between the first chamber 204 and the second chamber 206. The first floor 232 is configured to divide the first chamber 204 and the second chamber 206. In an example, the first chamber 204 has a first fluid, which is a mixture of fluids from the lower chambers (206, 208, 210). In some examples, the first ultrasonic level sensor 312 is located on underside of the cover 226. The first ultrasonic level sensor 312 is configured to measure the level of the first fluid in the first chamber 204.

The plurality of measurement sensors is located in the first chamber 204 (as shown in FIG. 3). In an implementation, the plurality of measurement sensors is configured to sense data pertaining to parameters important for a healthy and faster growth of the plant and generate a plurality of measurement signals. The parameters include pH, air, temperature, humidity, light intensity, and water level of the first chamber 204. The plurality of measurement sensors includes, but is not limited to, a pH sensor, an oxygen sensor, a temperature sensor, a humidity sensor, and a light intensity sensor. In another embodiment, the plurality of measurement sensors is spatially distributed throughout the housing 202 to sense previously mentioned parameters. The plurality of measurement sensors in the first chamber includes a pH sensor (304), a temperature sensor (306), and a humidity sensor (308) (as shown in FIG. 3).

The remaining chambers (206, 208, 210) are configured to contain various solutions that are essential for the growth of the plant. For example, the second chamber 206 may contain water, and the third chamber 208 may contain acid/pH-downer or base/pH-upper, depending on the species of plant. The fourth chamber 210 may contain liquid fertilizer. The water in the second chamber may also contain an algaecide.

The second chamber 206 includes a second floor 234, as shown in FIG. 2, a second fluid (not shown), a second submersible pump, a second ultrasonic level sensor, and at least two pipes through holes. The second floor 234 is located between the second chamber 206, and the third chamber 208. The second floor 234 is configured to divide the second chamber 206 and the third chamber 208. The second fluid is water.

The third chamber 208 includes a third floor 236, a third fluid, a third submersible pump, and at least one pipe through hole. The third floor 236 is located between the third chamber 208 and the fourth chamber 210. The third floor 236 is configured to divide the third chamber 208 and the fourth chamber 210. In an example, the third fluid is a pH positive fluid or a pH negative fluid.

The fourth chamber 210 includes a fourth floor 238, a fourth fluid, a fourth submersible pump, and a fourth submersible pump. The fourth floor 238 is located above a weighted base. The fourth submersible pump is immersed in the fourth fluid and is located on the fourth floor 238. In an example, the fourth fluid is at least one of a liquid fertilizer and a liquid insecticide.

Figure 5:
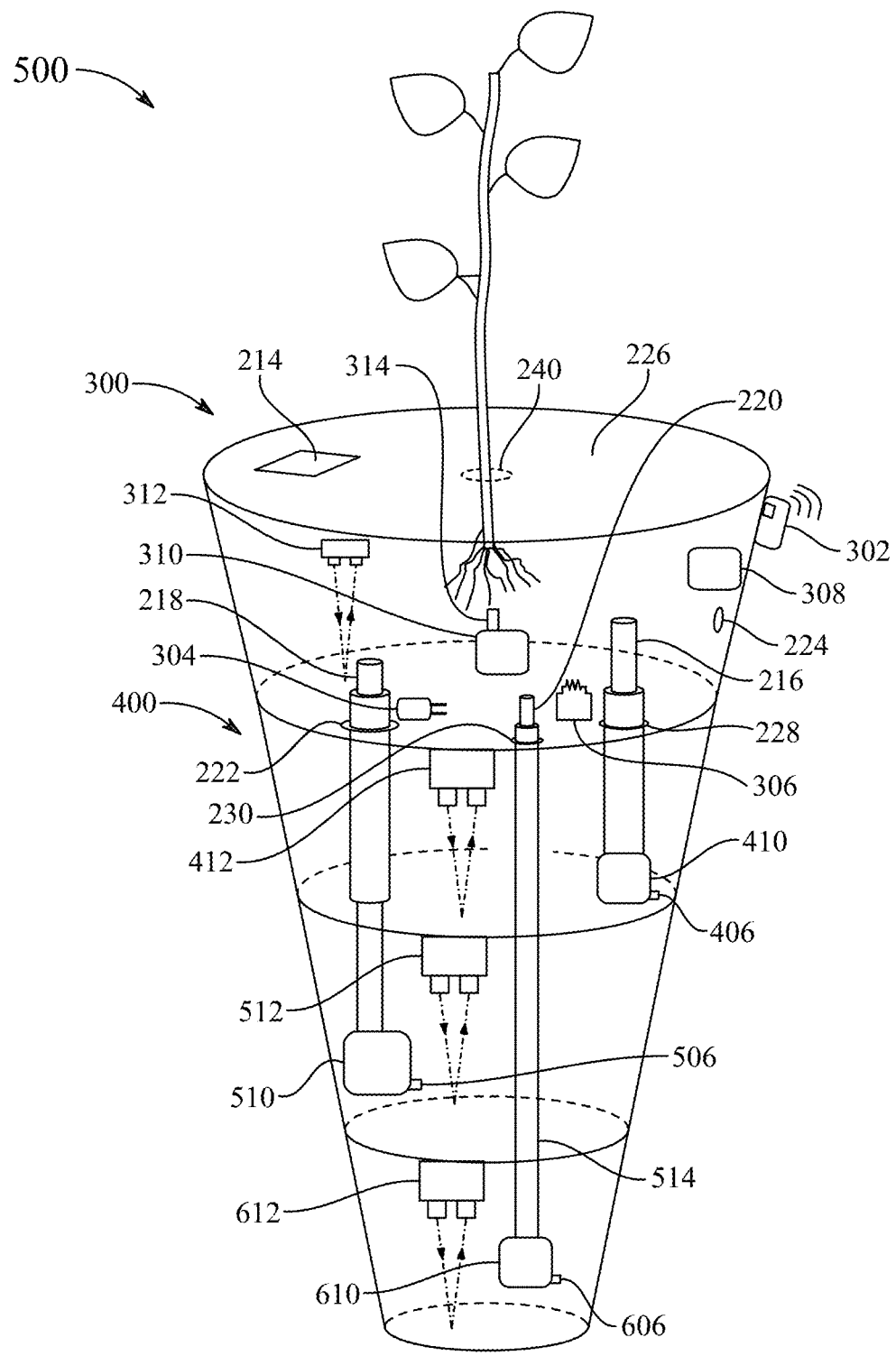
FIG. 5 illustrates an elaborated model of the chambers of the smart hydroponic vase, according to certain embodiments.

Further, the plurality of submersible pumps (310, 410, 510, 610 as shown in FIG. 5) is located within the elongated housing 202, configured to supply various fluids such as water, nutrients, and fertilizer to the root zone 212. Each of the plurality of submersible pumps is located in each of the plurality of chambers (204, 20, 208, 210), respectively. A first submersible pump is immersed in the first fluid and is located on the first floor 232. In an example, a spray nozzle 314 is connected to an output port of the first submersible pump. The spray nozzle 314 is configured to spray the first fluid onto the root system.

The plurality of submersible pumps (310, 410, 510, 610 as shown in FIG. 5) is fluidly connected with the plurality of pipes (216, 218, 220). Each pipe is connected to a different pipe located in the plurality of chambers (204, 206, 208, 210). Each of the plurality of chambers (204, 206, 208, 210) has at least one pipe. The pipe is connected to a respective submersible pump and is configured to provide access to the root zone 212. As shown in FIG. 2, the second chamber 206 has access to the root zone 212 through a first pipe 216, and the third chamber 208 has access to the root zone 212 through a second pipe 218. The fourth chamber 210 has access to the root zone 212 through a third pipe 220.

The smart hydroponic vase 200 has a plurality of access hole seals and a plurality of through hole seals. The plurality of access hole seals is configured to prevent fluid leakage between each pipe and each corresponding access hole. The plurality of through hole seals is configured to prevent fluid leakage between each pipe and each corresponding through hole. For example, the first pipe 216 has a first end that extends through a first pipe access hole 228 on the first floor 232 and a second end connected to the second submersible pump. The first floor 232 includes at least three pipe access holes (222, 228, 230). The second submersible pump is configured to pump the second fluid through the first pipe 216 into the first chamber 204. Also, the first pipe 216 is configured to access the root zone 212 through the first pipe access hole 228 in the first chamber 204, which is also sealed with a rubber seal to avoid leakage.

The second pipe 218 is configured to get access to the root zone 212 through a second pipe access hole 222 in the first chamber 204. The second pipe 218 has a first end which extends through the second pipe access hole 222 on the first floor 232 and through a first through-hole (not shown) on the second floor 234. The second pipe 218 has a second end connected to the third submersible pump located in the third chamber 208. The third submersible pump is configured to pump the third fluid through the second pipe 218 into the first chamber 204. The space between the second pipe 218 and the second pipe access hole 222 in the first chamber 204 is closed with a rubber seal to avoid leakage. Further, the space between the first through-hole and the second pipe 218 is closed with a rubber seal to avoid leakage.

The third pipe 220 has a first end which extends through a third pipe access hole 230 on the first floor 232, through a second through-hole (not shown) on the second floor 234, and through a third through-hole (not shown) on the third floor 236. The third pipe 220 has a second end connected to the fourth submersible pump. The fourth submersible pump is configured to pump the fourth fluid through the third pipe 220 into the first chamber 204.

The pipes 216, 218, 220 allow a farmer/user/plant manager to pour the appropriate mixture into the chambers (204, 206, 208, 210) without taking the system 100 apart. These pipes 216, 218, 220 support the respective submersible pump in the different chambers to pump their respective solutions up to the root zone 212. In some examples, the pipes (216, 218, 220) is designed to allow passing wiring of the plurality of sensors and the submersible pumps. The solutions in each chamber are not shown in the figures for the sake of clarity.

The first chamber 204 has a wiring aperture 224 configured to act as a power outlet. The wiring aperture 224 is configured to pass at least one wire that provides DC current to the various units of the smart hydroponic vase 200, such as submersible pumps, measurement sensors, ultrasonic level sensors, and a microprocessor. In some examples, the wiring aperture 224 may be used to pass at least one data cable connected to the sensors and the actuators such that sensors and the actuators have access to a microprocessor/controller/computer. The wiring aperture 224 is also padded with a rubber seal to prevent the microprocessor from contamination by moisture from the smart hydroponic vase.

FIG. 3 illustrates a front view of the first chamber 204 of the smart hydroponic vase 200 is shown, according to certain embodiments.

The root zone 212 is an area where the roots of the plant reside. The first chamber 204 is dedicated to the roots. As shown in FIG. 3, the first chamber 204 includes a casing 302, a pH sensor 304, a temperature sensor 306, a humidity sensor 308, the plurality of pipes (216, 218, 220), a first submersible pump 310, a first ultrasonic level sensor 312 and the wiring aperture 224. In an aspect, the casing 302 is configured to encloses the microprocessor 122, the wireless communications unit 128, the GPS unit 130 and the secondary memory 132. The casing 302 may be made of plastic or metal, such as galvanized steel.

The first chamber 204 includes the plurality of measurement sensors (pH sensor 304, temperature sensor 306, humidity sensor 308), and the ultrasonic level sensor 312 that is configured to monitor the environment (i.e., root zone). The pH sensor 304 is immersed in the first fluid. The pH sensor 304 is configured to measure an acidity and pH of the solution fed (first fluid) to the plant. In an example, the first fluid is a mixture of the second fluid, the third fluid and the fourth fluid.

The temperature sensor 306 is also immersed in the first fluid. The temperature sensor 306 is configured to measure a temperature of the first fluid. The humidity sensor 308 is located on an interior wall of the first chamber 204 above the first fluid. The humidity sensor 308 is configured to measure a relative humidity based on a content of water vapor in the first chamber 204. The humidity sensor 308 measures the ratio of air to water in the first chamber 204 since the roots need both water (and nutrients) and oxygen for the plant to grow.

The first ultrasonic level sensor 312 is located on the underside of the cover 226. The first ultrasonic level sensor 312 is configured to measure the level of the first fluid in the first chamber 204 and generate a first level signal. The first ultrasonic level sensor 312 ensures that the first fluid does not overflow the first chamber 204 or the first chamber 204 is empty.

The casing 302 is attached to an exterior wall of the first chamber 204. In examples, the casing 302 may attach to the exterior wall of the housing 202. The microprocessor 122, enclosed in the casing 302, is connected to the plurality of measurement sensors (pH sensor 304, temperature sensor 306, humidity sensor 308), the plurality of ultrasonic level sensors, and the plurality of submersible pumps.

The microprocessor 122 receives the measurement signals and the level signals from the plurality of measurement sensors (pH sensor 304, temperature sensor 306, humidity sensor 308), and the ultrasonic level sensor 312, respectively. The microprocessor 122 is configured to analyze the received measurement signals, and the level signals to determine whether the pH, the temperature, the humidity, and the level of the first fluid match the plant requirements. If the pH, the temperature, the humidity, and the level of the first fluid match the plant requirements, the microprocessor 122 is configured to actuate the first submersible pump 310 to spray the first fluid onto the root system. When the pH, the temperature, the humidity, and the level of the first fluid do not match the plant requirements, the microprocessor 122 is configured to generate the drive signals to actuate at least one of the second submersible pump, the third submersible pump, and the fourth submersible pump to pump at least one of the second fluid, the third fluid and the fourth fluid into the first chamber 204.

The microprocessor 122 uses the pH reading to decide whether to add more nutrients, acid, base, or water into the nutrient solution. The nutrient solution is fed to the plant's root by the first submersible pump 310, located in the first chamber 204. In an example, the first submersible pump 310 may be replaced by a sprinkler in the case of aeroponics. In an example, the microprocessor 122 is a single board computer (SBC) such as Raspberry Pi, Intel Galileo, or Beagle Bone.

The first submersible pump 310 is configured to control the environment of the root zone 212 by receiving the signals from the microprocessor 122 and taking appropriate actions.

In an example, the smart hydroponic vase 200 includes a rechargeable battery (not shown) located within the base of the smart hydroponic vase 200. The rechargeable battery is switchably connected by wiring to the microprocessor 122. The rechargeable battery is configured to recharge using a charging port. The charging port is located on an exterior side of the base. The charging port is connected to the battery to provide suitable current to recharge the rechargeable battery. In an example, the rechargeable battery is selected from the group consisting of non-aqueous lithium-ion battery, polymer lithium-ion battery and sodium sulfate battery.

In an operative example, a charge sensor is connected between the rechargeable battery and the microprocessor 122. The charge sensor is configured to measure charge level of the rechargeable battery and to generate a signal when the measured charge level of the rechargeable battery falls below a charge threshold.

The microprocessor 122 is configured to receive the generated signal from the charge sensor and transmit a message to the plant manager via the server 110 to recharge or change the rechargeable battery accordingly.

In an example, the smart hydroponic vase 200 includes a camera located on an exterior of the elongated housing near the cover 226. The camera is configured to take images of the body of the plant. The camera is connected to the microprocessor 122, for example, through a wiring or through wireless module. The microprocessor 122 is configured to actuate the camera to take the images and to receive the images from the camera. The microprocessor 122 is configured to monitor the health of the plants by analyzing the received image and notify the plant manager of any possible plant disease via the server 110.

The microprocessor 122 is configured to match received images of the plant to the images of plant conditions fetched from the plant database 126 and generate a state of the plant. The images of unhealthy plants are stored with identification of one of a disease or a parasite infestation.

The microprocessor 122 is configured to generate the communications packet having information including the pH level, the temperature level, the humidity level, the level of the first fluid, the level of the second fluid, the level of the third fluid, the level of the fourth fluid, the charge level of the rechargeable battery, the location coordinates, an image of the plant, and the state of the plant. The microprocessor 122 transmits the communications packet associated with the smart hydroponic vase 200 to the wireless access node 108 via the wireless communications unit 128. In an example, the wireless communications unit 128 is configured to transmit the communications packet directly to the plant manager.

The wiring aperture 224 is located above the first fluid and near the casing 302. The wiring aperture 224 is configured to pass wiring attached to the plurality of submersible pumps, the plurality of measurement sensors, and the plurality of ultrasonic level sensors to a connection port on the casing 302. In an example, the wiring aperture 224 is configured to pass through the cables that connect the microprocessor 122 to the sensors (pH sensor 304, temperature sensor 306, humidity sensor 308, ultrasonic level sensors 312). The first chamber 204 is configured to have 3 pipes (equal to the number of lower chambers in the hydroponic system). These 3 pipes (216, 218, 220) are drilled in the first floor 232, to provide access to fluids to the root zone 212 of the plant. In some examples, there may be more pipes in the first chamber 204 depending on the plant's requirements.

Figure 4:
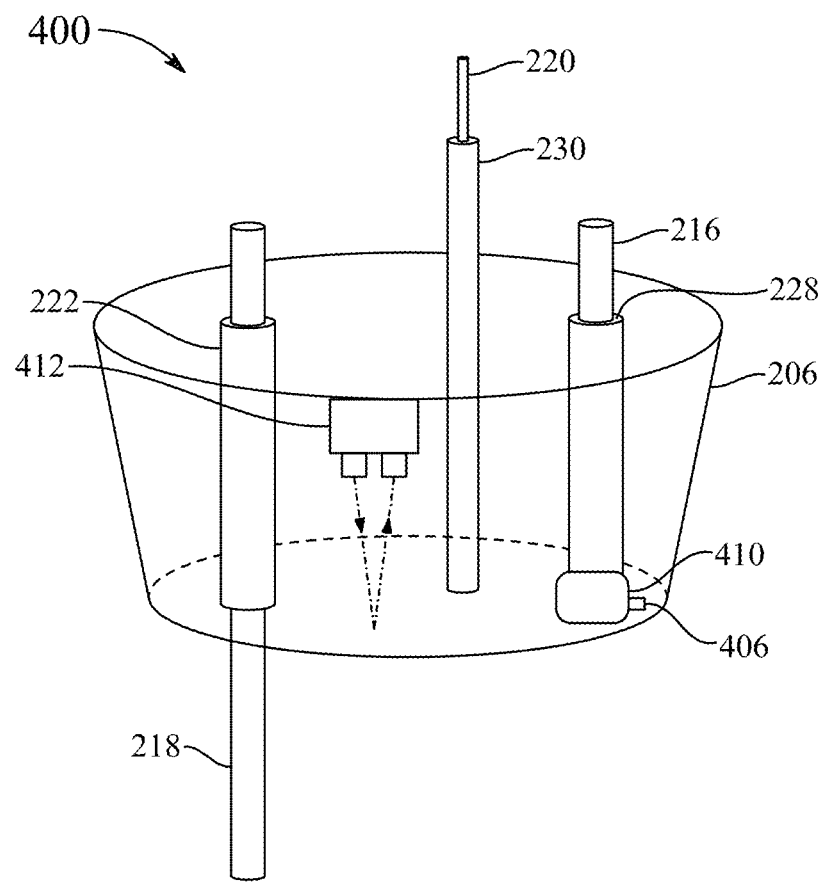
FIG. 4 illustrates a detailed model of a lower chamber of the smart hydroponic vase, according to certain embodiments.

FIG. 4 illustrates a detailed model 400 of a lower chamber (for example, second chamber 206) of the smart hydroponic vase 200, according to certain embodiments. Below the root zone 212 lies the chambers that contain nutrient solution, pH uppers, pH downers, and water. The number of lower chambers may be flexible depending on the requirements of the crop plant. In an example, the lower chamber may be the second chamber, the third chamber or the fourth chamber.

The second chamber 206 includes the second submersible pump 410 and the second ultrasonic sensor 412. The second submersible pump 410 is immersed in the second fluid and is configured to pump the second fluid to the root zone 212 lies in the first chamber. In an aspect, the second submersible pump 410 is configured to pump nutrients, solution from the underlying chambers to the first chamber 204. The outlet pipe 216 of the second submersible pump 410 pushes the solution or water through the access hole 228, while the inlet pipe 406 of the second submersible pump 410 pulls in the fluid. The second ultrasonic sensor 412 is used to measure the level of the solution or water in the second chamber 206 and generate the second level signal when the level of the solution falls below some threshold. The microprocessor 122 is configured to receive the second level signal from the second ultrasonic sensor 412 and notify the plant manager for refilling the second chamber 206. The plant manager may refill the second chamber 206 with the solution using the access hole 228. The second chamber 206 may include one or more through-holes, drilled in the second floor 234, to provide access to the pipes from the below chambers (208, 210). The number and size of the drilled through-holes depend on the number of chambers below the second chamber 206. For example, as shown in FIG. 4, there are two (2) through holes in the second chamber 206, indicating the presence of two (2) more lower chambers below it.

FIG. 5 illustrates an elaborated model of all chambers of the smart hydroponic vase 102, according to certain embodiments.

The construction of chambers 300 and 400 is substantially similar to the first chamber 204, and the second chamber 206 as disclosed in FIG. 3 and FIG. 4, and thus the construction is not repeated here in detail for the sake of brevity.

The third chamber 208 includes a third floor 236, a third fluid, a third submersible pump 510, a third ultrasonic level sensor 512, and at least one pipe 218. The third floor 236 is located between the third chamber 208 and the fourth chamber 210. The third floor 236 is configured to divide the third chamber 208 and the fourth chamber 210. The third submersible pump 510 is immersed in the third fluid and located on the third floor 236. The third submersible pump 510 is configured to pump the third fluid to the first chamber 204. In an aspect, the third submersible pump 510 is configured to pump nutrients, and solutions from the underlying chamber such as 210 to the first chamber 204. The outlet pipe 218 of the third submersible pump 510 pushes the third fluid through the second pipe access hole 222, while the inlet pipe 506 of the third submersible pump 510 pulls in the fluid. The third ultrasonic level sensor 512 is located on an underside of the second floor 234. The third ultrasonic sensor 512 is used to measure the level of the third fluid in the third chamber 208 and generate the third level signal when the level of the solution falls below some threshold. The microprocessor 122 is configured to receive the third level signal from the third ultrasonic sensor 512 and notify the plant manager for refilling the third chamber 208. The plant manager may refill the third chamber 208 with the solution using second pipe access hole 222. Further, the third floor has a hole through 514 for passing at least one pipe 220 through.

The fourth chamber 210 includes a fourth floor 238, a fourth fluid, a fourth submersible pump 610, and a fourth ultrasonic level sensor 612. The fourth floor 238 is located above a weighted base (not shown). The fourth submersible pump 610 is immersed in the fourth fluid and is located on the fourth floor 238. The fourth submersible pump 610 is configured to pump the fourth fluid to the first chamber 204. The outlet pipe 220 of the fourth submersible pump 610 pushes the fourth fluid through the access hole 230, while the inlet pipe 606 of the fourth submersible pump 610 pulls in the fluid. The fourth ultrasonic level sensor 612 is located on an underside of the third floor 236. The fourth ultrasonic level sensor 612 is configured to measure the level of the fourth fluid and generate the fourth level signal when the level of the solution falls below some threshold. The microprocessor 122 is configured to receive the fourth level signal from the fourth ultrasonic sensor 612 and notify the plant manager for refilling the fourth chamber 210. The plant manager may refill the fourth chamber 210 with the solution using the access hole 230.

In an aspect, the smart hydroponic vase 200 includes a fifth chamber (not shown) located between a floor of the fourth chamber 210 and the base. The fifth chamber includes a fifth fluid, a fifth submersible pump immersed in the fifth fluid, and a fifth ultrasonic level sensor located on an underside of the floor of the fourth chamber 210.

The fourth pipe having a first end that extends through a fourth pipe access hole in the first floor, through a third through hole in the second floor, through a second through hole in the third floor, and through a first through hole in the fourth floor, the fifth pipe having a second end connected to the fifth submersible pump, wherein the fifth submersible pump is configured to pump the fifth fluid through the fourth pipe into the first chamber 204. In an example, the fifth fluid is a liquid insecticide.

In an aspect, the smart hydroponic vase 200 includes an overflow chamber which is configured to store the excess fluid drained from the root zone 212.

Figure 6:
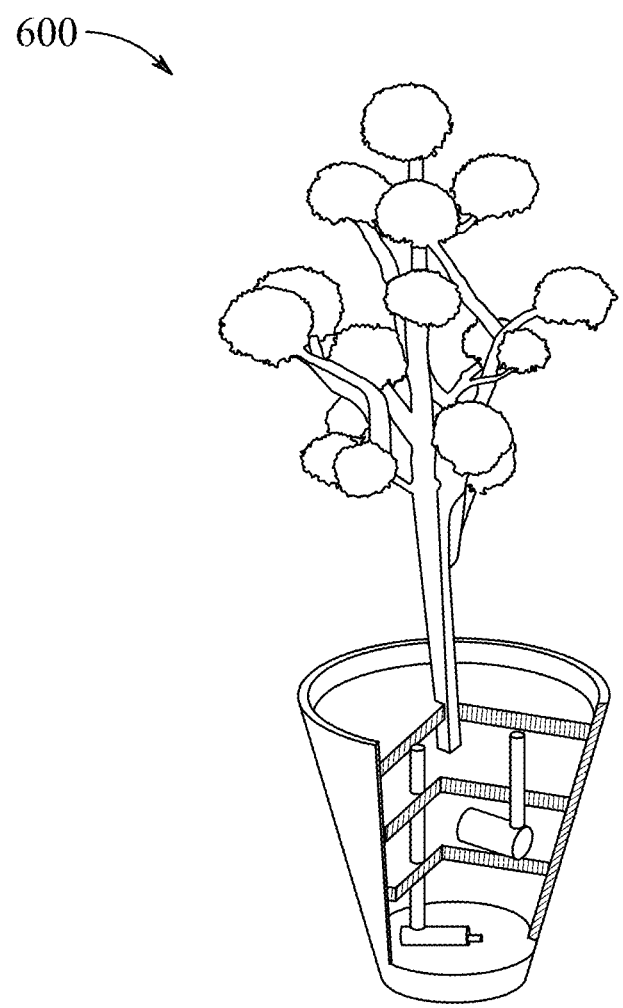
FIG. 6 illustrates a cross-sectional view of the smart hydroponic vase, according to certain embodiments.

FIG. 6 illustrates a cross-sectional view 600 of the smart hydroponic vase 200, according to certain embodiments. As shown in FIG. 6, the smart hydroponic vase 200 includes the plurality of chambers. The smart hydroponic vase 200 may be used for ornamental plants.

Figure 7:
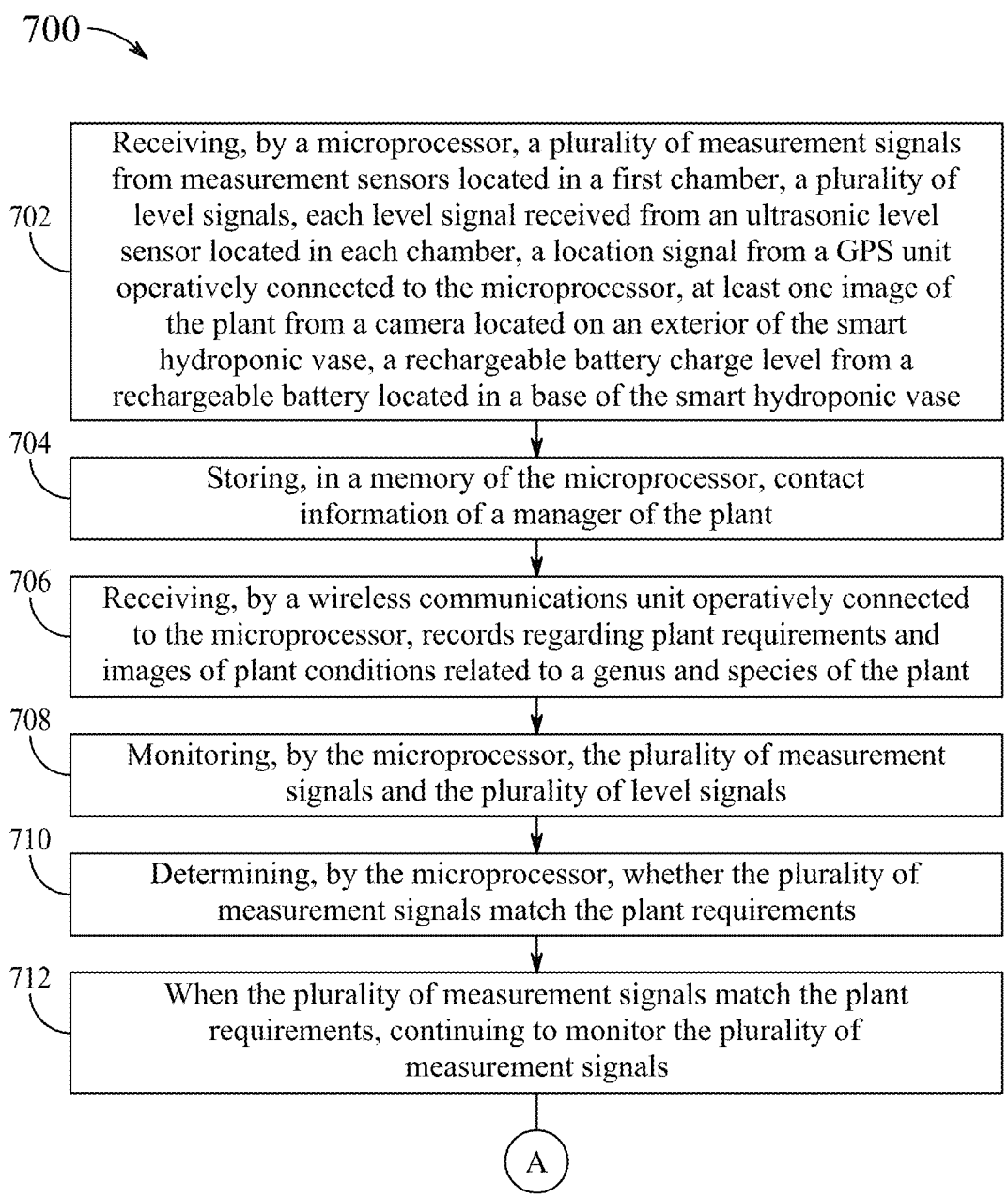
FIG. 7 illustrates a process flow for growing a plant in the smart hydroponic vase, according to certain embodiments.
Figure 7:
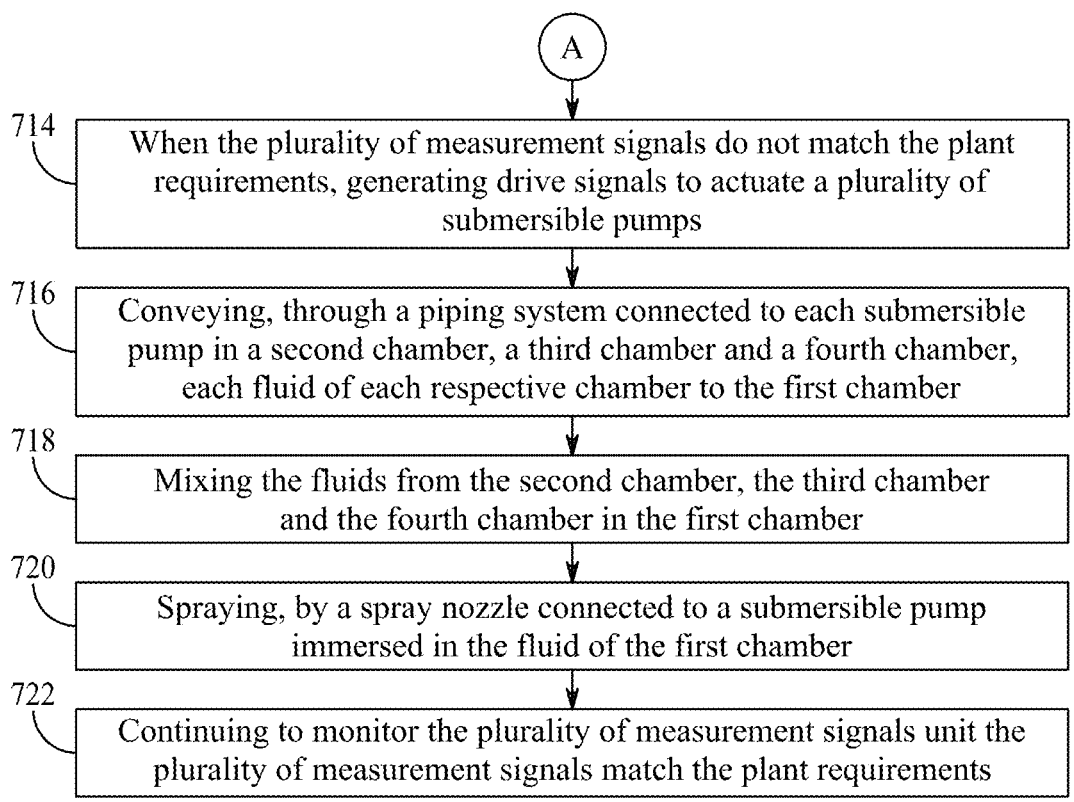

FIG. 7 illustrates a process flow 700 for growing a plant in the smart hydroponic vase 200. The smart hydroponic vase 200 includes at least four chambers. Each of the chambers includes a fluid.

Step 702 includes receiving a plurality of measurement signals from the plurality of measurement sensors located in a first chamber 204 and a level signal by an ultrasonic level sensor. In an example, each level signal is received from the ultrasonic level sensor located in each chamber. Further, the microprocessor 122 receives a location signal from a GPS unit operatively connected to the microprocessor 122. The microprocessor 122 receives at least one image of the plant from a camera located on an exterior of the smart hydroponic vase 200. Also, in an example, the microprocessor 122 is configured to receive a rechargeable battery charge level from a charge sensor associated with a rechargeable battery located in a base of the smart hydroponic vase 200.

Step 704 includes storing contact information of a plant manager of the plant in a memory of the microprocessor 122.

Step 706 includes receiving records regarding plant requirements and images of plant conditions related to a genus and species of the plant by a wireless communications unit. The wireless communications unit is operatively connected to the microprocessor 122.

Step 708 includes monitoring the plurality of measurement signals and the plurality of level signals by the microprocessor 122.

Step 710 includes determining, by the microprocessor 122, whether the plurality of measurement signals matches the plant requirements.

Step 712 includes continuing, by the microprocessor 122, to monitor the plurality of measurement signals when the plurality of measurement signals matches the plant requirements.

Step 714 includes generating drive signals, by the microprocessor 122, to actuate a plurality of submersible pumps when the plurality of measurement signals does not match the plant requirements. Each chamber includes one submersible pump immersed in the fluid of the respective chamber.

Step 716 includes conveying, through a piping system connected to each submersible pump in a second chamber 206, a third chamber 208, and a fourth chamber 210, each fluid of each respective chamber to the first chamber 204.

Step 718 includes mixing the fluids from the second chamber 206, the third chamber 208, and the fourth chamber 210 in the first chamber 204.

Step 720 includes spraying by a spray nozzle 314 connected to a submersible pump immersed in the fluid of the first chamber 204, a root system of the plant.

Step 722 includes continuing to monitor, by the microprocessor 122, the plurality of measurement signals unit the plurality of measurement signals match the plant requirements. The method further includes step of matching the at least one image of the plant to the images of plant conditions, wherein the images of plant conditions include images of healthy plants and images of unhealthy plants, wherein the images of unhealthy plants are stored with identification of one of a disease or a parasite infestation, and generating a state of the plant.

The method further includes a step of generating, by the microprocessor 122, a communications packet including the contact information of the plant manager, the plurality of measurement signals, the plurality of level signals, rechargeable battery charge level, the location coordinates, an image of the plant, and the state of the plant.

The method further includes a step transmitting to a server, by the wireless communications unit, the communications packet. The method further includes step transmitting, by the server, the communications packet to the plant manager.

Figure 8:
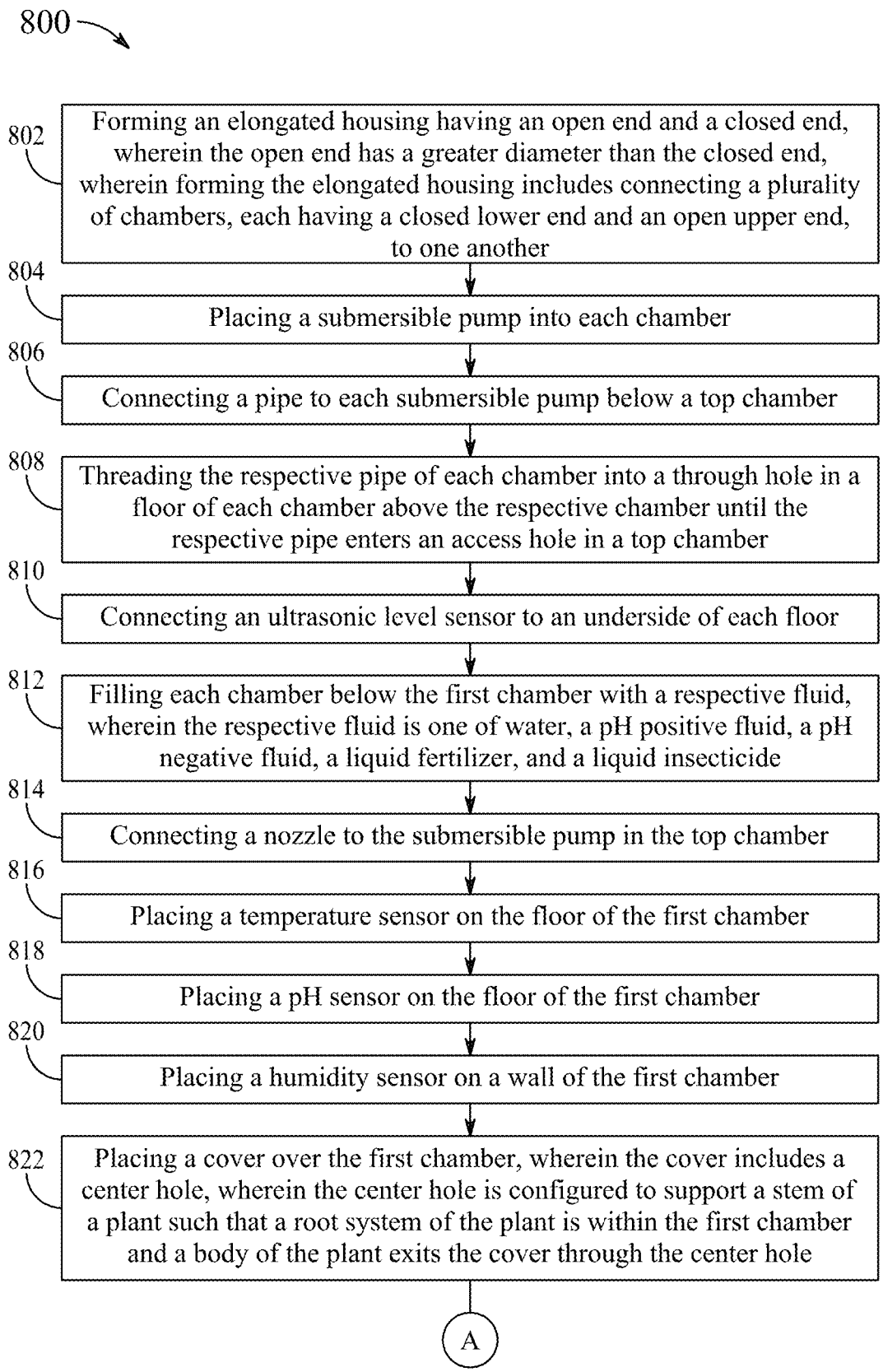
FIG. 8 illustrates a process flow of assembling the smart hydroponic vase, according to certain embodiments.
Figure 8:
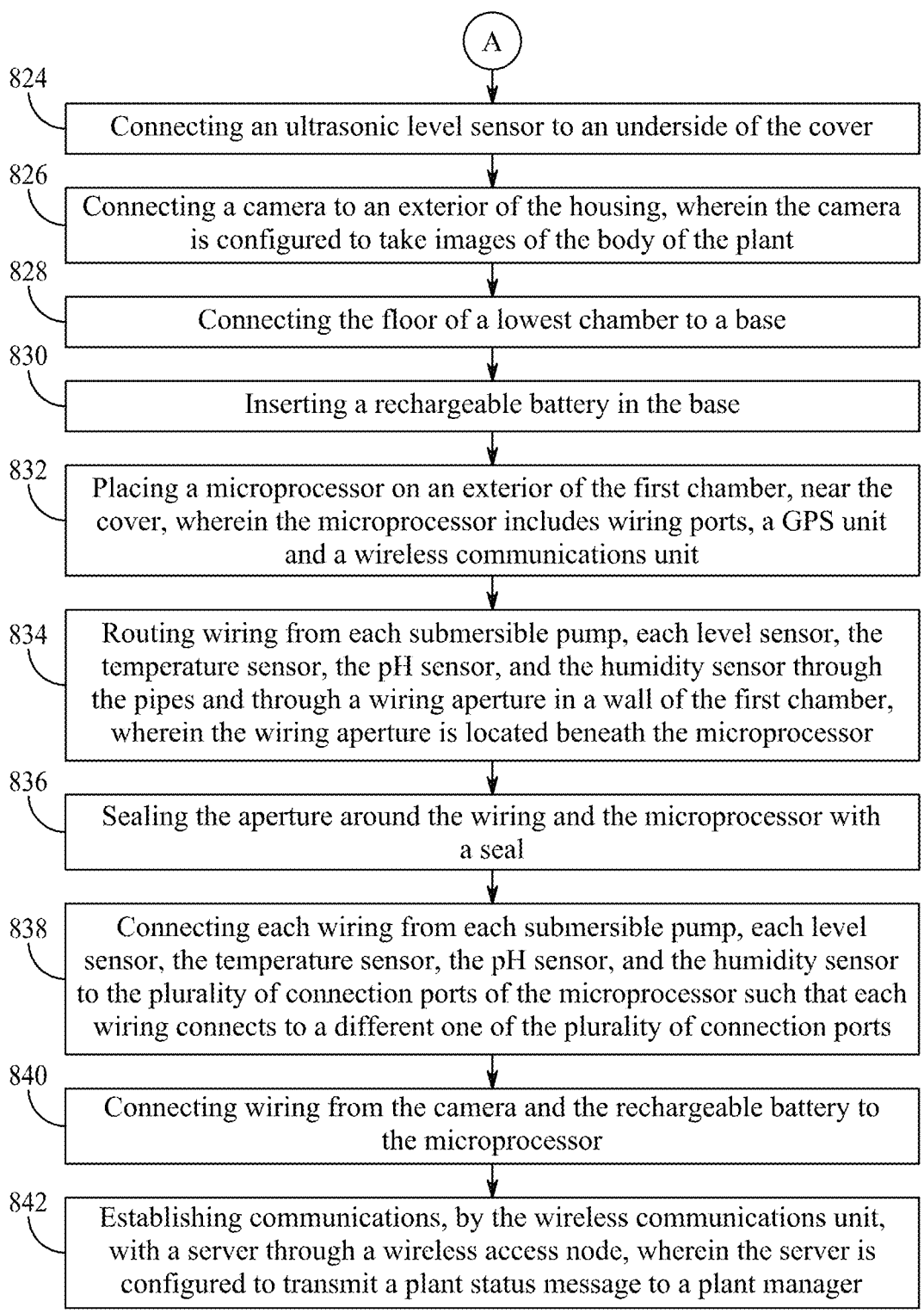

FIG. 8 illustrates a process flow 800 of assembling the smart hydroponic vase 200, according to certain embodiments.

Step 802 includes forming an elongated housing 202 having an open end and a closed end. In an example, the open end has a greater diameter than the closed end. In some examples, forming the elongated housing includes connecting a plurality of chambers, each having a closed lower end and an open upper end, to one another.

Step 804 includes placing a submersible pump into each chamber.

Step 806 includes connecting a pipe to each submersible pump below a top chamber.

Step 808 includes threading the respective pipe of each chamber into a through-hole in a floor of each chamber above the respective chamber until the respective pipe enters an access hole in a top chamber.

Step 810 includes connecting an ultrasonic level sensor to an underside of each floor.

Step 812 includes filling each chamber below the first chamber 204 with a respective fluid, wherein the respective fluid is one of water, a pH positive fluid, a pH negative fluid, a liquid fertilizer, and a liquid insecticide.

Step 814 includes connecting a nozzle to the submersible pump in the top chamber.

Step 816 includes placing a temperature sensor 306 on the floor of the first chamber 204.

Step 818 includes placing a pH sensor 304 on the floor of the first chamber 204.

Step 820 includes placing a humidity sensor 308 on a wall of the first chamber 204.

Step 822 includes placing a cover 226 over the first chamber 204, wherein the cover 226 includes a center hole 240, wherein the center hole 240 is configured to support a stem of a plant such that a root system of the plant is within the first chamber 204 and a body of the plant exits the cover through the center hole 240.

Step 824 includes connecting an ultrasonic level sensor 312 to an underside of the cover 226.

Step 826 includes connecting a camera to an exterior of the housing 202. In some examples, the camera is configured to take images of the body of the plant.

Step 828 includes connecting the floor of a lowest chamber to a base.

Step 830 includes inserting a rechargeable battery in the base.

Step 832 includes placing a casing 302 on an exterior of the first chamber 204, near the cover 226, wherein the casing 302 includes a plurality of connection ports, the microprocessor 122, a GPS unit 130 and a wireless communications unit 128.

Step 834 includes routing wiring from each submersible pump, each level sensor, the temperature sensor, the pH sensor, and the humidity sensor through the pipes and through a wiring aperture 224 in a wall of the first chamber 204, wherein the wiring aperture is located beneath the microprocessor 122.

Step 836 includes sealing the wiring aperture 224 around the wiring and the microprocessor 122 with a seal.

Step 838 includes connecting each wiring from each submersible pump, each level sensor, the temperature sensor, the pH sensor, and the humidity sensor to the plurality of connection ports of the microprocessor 122 such that each wiring connects to a different one of the plurality of connection ports.

Step 840 includes connecting a wire from the camera and a wire of the rechargeable battery to camera connection port and a battery connection port, respectively, of microprocessor 112.

Step 842 includes establishing communications, by the wireless communications unit 128, with a server 110 through a wireless access node 108. The server 110 is configured to transmit a plant status message to a plant manager.

The first embodiment is illustrated with respect to FIGS. 1-8. The first embodiment describes the smart hydroponic vase system 100. The smart hydroponic vase system 100 includes an elongated housing 202 having an open end and a closed end, wherein the open end has a greater diameter than the closed end; a plurality of chambers (204, 206, 208, 210) within the elongated housing 202, the plurality of chambers including at least a first chamber 204, a second chamber 206 located beneath the first chamber 204, a third chamber 208 located beneath the second chamber 206, and a fourth chamber 210 located beneath the third chamber 208; a plurality of submersible pumps (not shown), wherein a submersible pump is located in each of the plurality of chambers; a plurality of pipes (216, 218, 220), wherein each pipe connects a different one of the second, the third, and the fourth chamber to the first chamber 204, wherein each pipe is connected to a respective submersible pump; a plurality of measurement sensors located in the first chamber 204, wherein each measurement sensor is configured to generate measurement signals; a plurality of ultrasonic level sensors, wherein each chamber includes an ultrasonic level sensor, wherein each ultrasonic level sensor is configured to measure a level of a respective fluid in said each chamber and generate a level signal; a microprocessor 122 attached to an exterior wall of the first chamber 204, wherein the microprocessor 122 is connected to the plurality of measurement sensors, the plurality of ultrasonic level sensors, and the plurality of submersible pumps, wherein the microprocessor 122 is configured to receive the measurement signals and the level signals and generate drive signals to actuate the plurality of pumps based on the measurement signals and the level signals; and a wireless communications unit connected to the microprocessor 122.

The smart hydroponic vase system 100 further includes a cover 226 connected to a mouth of the first chamber 204; a center hole 240 located in the cover 226, wherein the center hole 240 is configured to support a stem of a plant such that a root system of the plant is within the first chamber 204 and a body of the plant exits the cover 226 through the center hole 240; an air vent 214 located in the cover 226 between the center hole 240 and a perimeter of the cover 226; a first floor 232 located between the first chamber 204 and the second chamber 206, wherein the first floor 232 is configured to divide the first chamber 204 and the second chamber 206; at least three pipe access holes located in the first floor; a first fluid located in the first chamber 204; a wiring aperture 224 located above the first fluid and near the microprocessor 122, wherein the wiring aperture 224 is configured to pass wiring attached to the plurality of submersible pumps, the plurality of measurement sensors, and the plurality of ultrasonic level sensors to a connection port on the microprocessor 122; a first submersible pump of the plurality of submersible pumps immersed in the first fluid and located on the first floor; and a spray nozzle 314 connected to an output port of the first submersible pump, wherein the spray nozzle 314 is configured to spray the first fluid onto the root system.

The plurality of measurement sensors located in the first chamber 204 include a pH sensor 304 immersed in the first fluid, wherein the pH sensor 304 is configured to measure an acidity of the first fluid; a temperature sensor 306 immersed in the first fluid, wherein the temperature sensor is configured to measure a temperature of the first fluid; and a humidity sensor 308 located on an interior wall of the first chamber 204 above the first fluid, wherein the humidity sensor 308 is configured to measure a relative humidity based on a content of water vapor in the first chamber 204.

The smart hydroponic vase system 100 further includes a first ultrasonic level sensor 312 located on an underside of the cover 226, wherein the first ultrasonic level sensor is configured to measure the level of the first fluid in the first chamber 204.

The second chamber 206 includes a second floor 234 located between the second chamber 206 and the third chamber 208, wherein the second floor 234 is configured to divide the second chamber 206 and the third chamber 208; a second fluid; a second submersible pump of the plurality of submersible pumps immersed in the second fluid and located on the second floor; a second ultrasonic level sensor located on an underside of the first floor, wherein the second ultrasonic level sensor is configured to measure the level of the second fluid; and at least two pipe through holes located in the second floor.

The third chamber 208 includes a third floor 236 located between the third chamber 208 and the fourth chamber 210, wherein the third floor 236 is configured to divide the third chamber 208 and the fourth chamber 210; a third fluid; a third submersible pump of the plurality of submersible pumps immersed in the third fluid and located on the third floor 236; a third ultrasonic level sensor located on an underside of the third floor 236, wherein the third ultrasonic level sensor is configured to measure the level of the third fluid; and at least one pipe through hole located in the third floor 236.

The fourth chamber 210 includes a fourth floor located above a weighted base; a fourth fluid; a fourth submersible pump of the plurality of submersible pumps immersed in the fourth fluid and located on the fourth floor; and a fourth ultrasonic level sensor (408) is located on an underside of the third floor 236, wherein the fourth ultrasonic level sensor is configured to measure the level of the fourth fluid.

The smart hydroponic vase system 100 further includes a first pipe having a first end which extends through a first pipe access hole in the first floor 232 and a second end connected to the second submersible pump, wherein the second submersible pump is configured to pump the second fluid through the first pipe into the first chamber 204; a second pipe 218 having a first end which extends through a second pipe access hole in the first floor 232 and through a first through hole in the second floor, the second pipe 218 having a second end connected to the third submersible pump, wherein the third submersible pump is configured to pump the third fluid through the second pipe 218 into the first chamber 204; a third pipe having a first end which extends through a third pipe access hole in the first floor, through a second through hole in the second floor, and through a third through hole in the third floor 236, the third pipe having a second end connected to the fourth submersible pump, wherein the fourth submersible pump is configured to pump the fourth fluid through the third pipe into the first chamber 204; a plurality of access hole seals configured to prevent fluid leakage between each pipe and each corresponding access hole; and a plurality of through hole seals, configured to prevent fluid leakage between each pipe and each corresponding through hole.

In an example, the first fluid is a mixture of the second fluid, the third fluid and the fourth fluid; the second fluid is water; the third fluid is one of a pH positive fluid and a pH negative fluid; and the fourth fluid is at least one of a liquid fertilizer and a liquid insecticide.

The smart hydroponic vase system 100 further includes a rechargeable battery located within the base, wherein the rechargeable battery is switchably connected by wiring to the microprocessor 122; a charging port located on an exterior side of the base, wherein the charging port is connected to the battery; and a charge sensor connected between the rechargeable battery and the microprocessor 122, wherein the charge sensor is configured to generate a signal when a charge level of the rechargeable battery falls below a charge threshold.

The smart hydroponic vase system 100 further includes a camera located on an exterior of the elongated housing near the cover 226, wherein the camera is configured to take images of the body of the plant, wherein wiring from the camera is connected to the microprocessor 122, and wherein the microprocessor 122 is configured to actuate the camera to take the images and to receive the images from the camera.

The smart hydroponic vase system 100 further includes a plant database located in the microprocessor 122, wherein the database includes records relating a genus of the plant, a species of the plant, an age of the plant, plant requirements, and images of plant conditions; wherein the microprocessor 122 is configured to analyze the measurement signals, and the level signals to determine whether the pH, the temperature, the humidity and the level of the first fluid match the plant requirements; when the pH, the temperature, the humidity and the level of the first fluid match the plant requirements, actuate the first submersible pump to spray the first fluid onto the root system; and when the pH, the temperature, the humidity and the level of the first fluid do not match the plant requirements, generate the drive signals to actuate at least one of the second submersible pump, the third submersible pump, and the fourth submersible pump to pump at least one of the second fluid, the third fluid and the fourth fluid into the first chamber 204.

The microprocessor 122 is further configured to match images of the plant to the images of plant conditions, wherein the plant conditions include images of healthy plants and images of unhealthy plants, wherein the images of unhealthy plants are stored with identification of one of a disease or a parasite infestation; and generate a state of the plant.

The smart hydroponic vase system 100 further includes a memory located in the microprocessor 122, wherein the memory is configured to store contact information of a manager of the plant; a GPS unit connected to the microprocessor 122, the GPS unit configured to generate location coordinates of the smart hydroponic vase system 100; wherein the microprocessor 122 is configured to generate a communications packet including the pH level, the temperature level, the humidity level, the level of the first fluid, the level of the second fluid, the level of the third fluid, the level of the fourth fluid, the charge level of the rechargeable battery, the location coordinates, an image of the plant, and the state of the plant; and wherein the wireless communications unit is configured to transmit the communications packet to the plant manager.

The wireless communications unit 128 is configured to transmit the genus of the plant and the species of the plant to a wireless access node 108 in communication with a server 110; wherein the server 110 is configured to match the genus of the plant and the species of the plant to a record of plant requirements and plant conditions; wherein the server 110 is configured to transmit the record to the wireless access node 108; wherein the wireless access node 108 is configured to transmit the record to the wireless communications unit; and wherein the microprocessor 122 is configured with instructions to update the database with the record.

The smart hydroponic vase system 100 further includes a fifth chamber located between a floor of the fourth chamber 210 and the base, wherein the fifth chamber includes a fifth fluid, a fifth submersible pump immersed in the fifth fluid, and a fifth ultrasonic level sensor located on an underside of the floor of the fourth chamber 210; a fourth pipe having a first end which extends through a fourth pipe access hole in the first floor, through a third through hole in the second floor, through a second through hole in the third floor 236, and through a first through hole in the fourth floor, the fifth pipe having a second end connected to the fifth submersible pump, wherein the fifth submersible pump is configured to pump the fifth fluid through the fourth pipe into the first chamber 204; wherein the first fluid is a mixture of the second fluid, the third fluid, the fourth fluid and the fifth fluid; the second fluid is water; the third fluid is one of a pH positive fluid and a pH negative fluid; the fourth fluid is a liquid fertilizer; and the fifth fluid is a liquid insecticide.

The second embodiment is illustrated with respect to FIGS. 1-8. The second embodiment describes a method for growing a plant in a smart hydroponic vase. The method includes receiving, by a microprocessor 122, a plurality of measurement signals from measurement sensors located in a first chamber 204, a plurality of level signals, each level signal received from an ultrasonic level sensor located in each chamber, a location signal from a GPS unit operatively connected to the microprocessor 122, at least one image of the plant from a camera located on an exterior of the smart hydroponic vase, a rechargeable battery charge level from a rechargeable battery located in a base of the smart hydroponic vase; storing, in a memory of the microprocessor 122, contact information of a manager of the plant; receiving, by a wireless communications unit operatively connected to the microprocessor 122, records regarding plant requirements and images of plant conditions related to a genus and species of the plant; monitoring, by the microprocessor 122, the plurality of measurement signals and the plurality of level signals; determining, by the microprocessor 122, whether the plurality of measurement signals match the plant requirements; when the plurality of measurement signals match the plant requirements, continuing to monitor the plurality of measurement signals; when the plurality of measurement signals do not match the plant requirements, generating drive signals to actuate a plurality of submersible pumps, wherein each chamber includes one submersible pump immersed in the fluid of the respective chamber; conveying, through a piping system connected to each submersible pump in a second chamber 206, a third chamber 208 and a fourth chamber 210, each fluid of each respective chamber to the first chamber 204; mixing the fluids from the second chamber 206, the third chamber 208 and the fourth chamber 210 in the first chamber 204; spraying, by a spray nozzle 314 connected to a submersible pump immersed in the fluid of the first chamber 204, a root ball of the plant; and continuing to monitor the plurality of measurement signals unit the plurality of measurement signals match the plant requirements.

The method further includes matching the at least one image of the plant to the images of plant conditions, wherein the images of plant conditions include images of healthy plants and images of unhealthy plants, wherein the images of unhealthy plants are stored with identification of one of a disease or a parasite infestation; and generating a state of the plant.

The method further includes generating, by the microprocessor 122, a communications packet including the contact information of the plant manager, the plurality of measurement signals, the plurality of level signals, rechargeable battery charge level, the location coordinates, an image of the plant, and the state of the plant; transmitting to a server 110, by the wireless communications unit, the communications packet; and transmitting, by the server 110, the communications packet to the plant manager.

The third embodiment is illustrated with respect to FIGS. 1-8. The third embodiment describes a method of assembling a smart hydroponic vase. The method includes forming an elongated housing having an open end and a closed end, wherein the open end has a greater diameter than the closed end, wherein forming the elongated housing includes connecting a plurality of chambers, each having a closed lower end and an open upper end, to one another; placing a submersible pump into each chamber; connecting a pipe to each submersible pump below a top chamber; threading the respective pipe of each chamber into a through hole in a floor of each chamber above the respective chamber until the respective pipe enters an access hole in a top chamber; connecting an ultrasonic level sensor to an underside of each floor; filling each chamber below the first chamber 204 with a respective fluid, wherein the respective fluid is one of water, a pH positive fluid, a pH negative fluid, a liquid fertilizer, and a liquid insecticide; connecting a spray nozzle to the submersible pump in the top chamber; placing a temperature sensor on the floor of the first chamber 204; placing a pH sensor on the floor of the first chamber 204; placing a humidity sensor 308 on a wall of the first chamber 204; placing a cover 226 over the first chamber 204, wherein the cover 226 includes a center hole 240, wherein the center hole 240 is configured to support a stem of a plant such that a root system of the plant is within the first chamber 204 and a body of the plant exits the cover through the center hole 240; connecting an ultrasonic level sensor 312 to an underside of the cover 226; connecting a camera to an exterior of the housing 202. In some examples, the camera is configured to take images of the body of the plant; connecting the floor of a lowest chamber to a base; inserting a rechargeable battery in the base; placing a casing 302 on an exterior of the first chamber 204, near the cover 226, wherein the casing 302 includes a plurality of connection ports, the microprocessor 122, a GPS unit 130 and a wireless communications unit 128; routing wiring from each submersible pump, each level sensor, the temperature sensor, the pH sensor, and the humidity sensor through the pipes and through a wiring aperture 224 in a wall of the first chamber 204, wherein the wiring aperture is located beneath the microprocessor 122; sealing the aperture 224 around the wiring and the microprocessor 122 with a seal; connecting each wiring from each submersible pump, each level sensor, the temperature sensor, the pH sensor, and the humidity sensor to the plurality of connection ports of the microprocessor 122 such that each wiring connects to a different one of the plurality of connection ports; connecting a wire from the camera and a wire of the rechargeable battery to camera connection port and a battery connection port, respectively, of microprocessor 112; and establishing communications, by the wireless communications unit 128, with a server 110 through a wireless access node 108. The server 110 is configured to transmit a plant status message to a plant manager.

Figure 9:
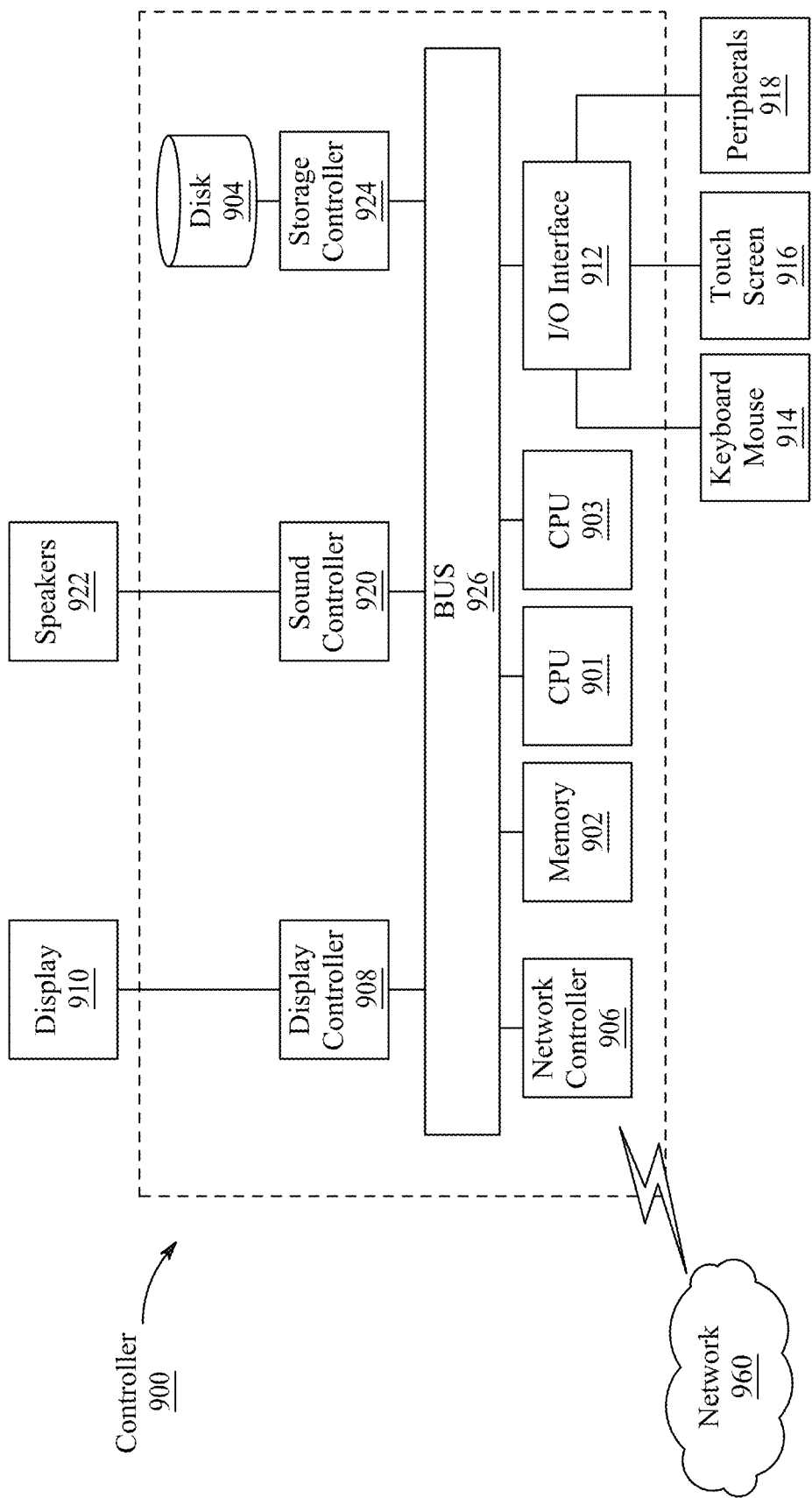
FIG. 9 is an illustration of a non-limiting example of details of computing hardware used in the computing system, according to certain embodiments.

Next, further details of the hardware description of the computing environment of FIG. 1 according to exemplary embodiments are described with reference to FIG. 9. In FIG. 9, a controller 900 is described is representative of the microprocessor 122 of a smart hydroponic vase 102 as shown in FIG. 1 in which the microprocessor 122 is a computing device which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 9, Microsoft Windows 10, UNIX, Solaris, LINUX, Apple MAC-OS and other systems known to those skilled in the art. The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 1110. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 1108, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
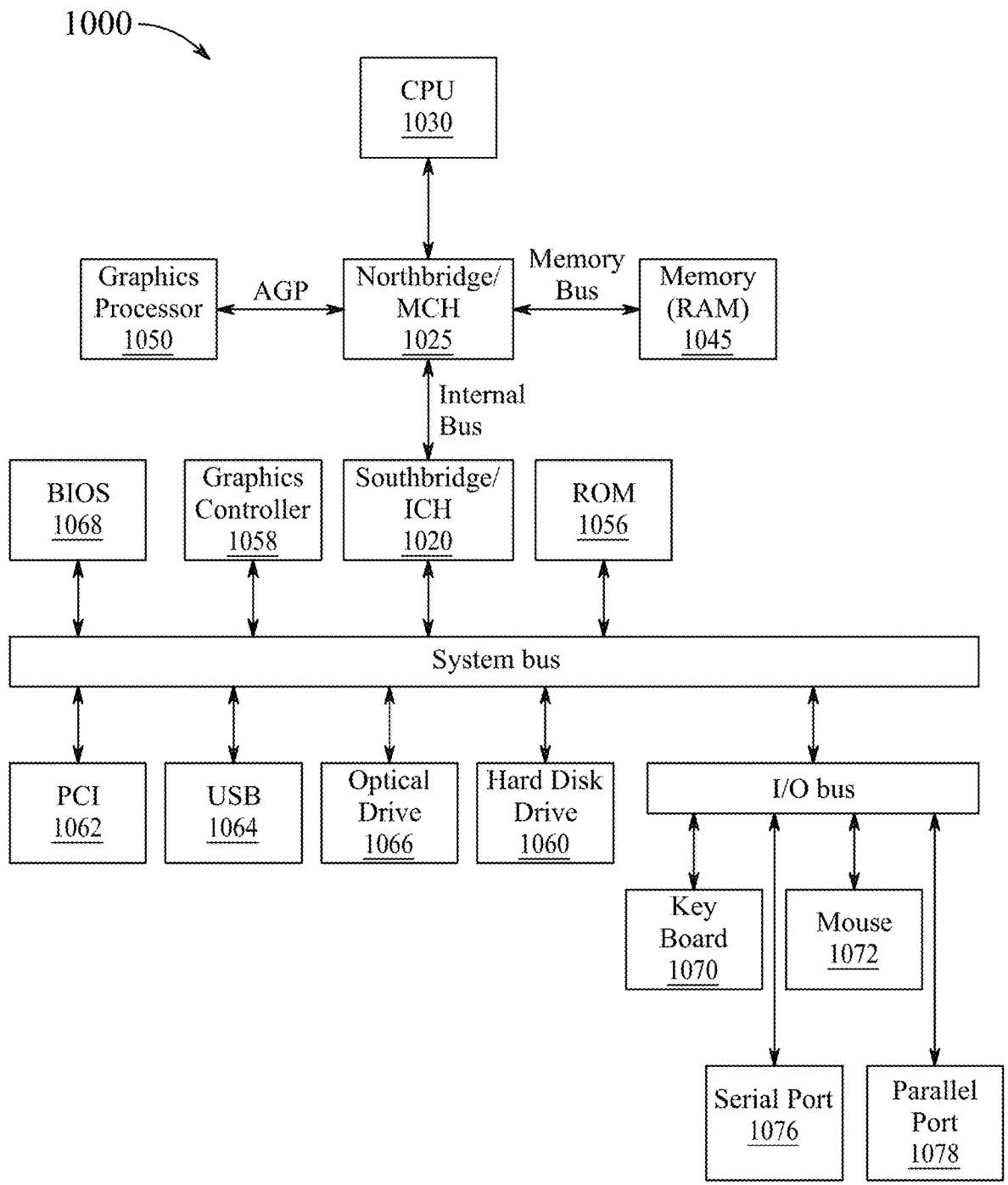
FIG. 10 is an exemplary schematic diagram of a data processing system used within the computing system, according to certain embodiments.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
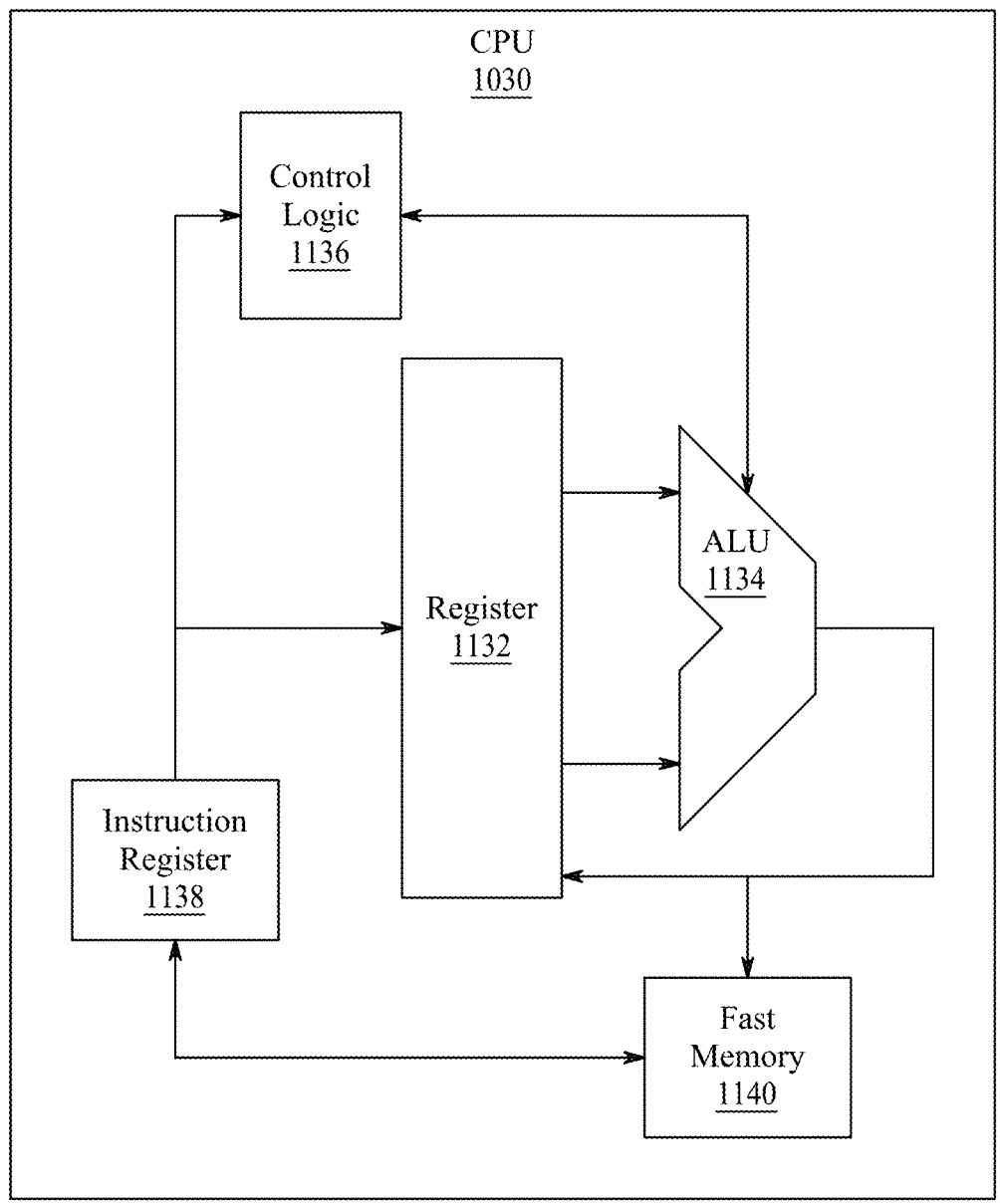
FIG. 11 is an exemplary schematic diagram of a processor used with the computing system, according to certain embodiments.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspects of the present disclosure, the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 12:
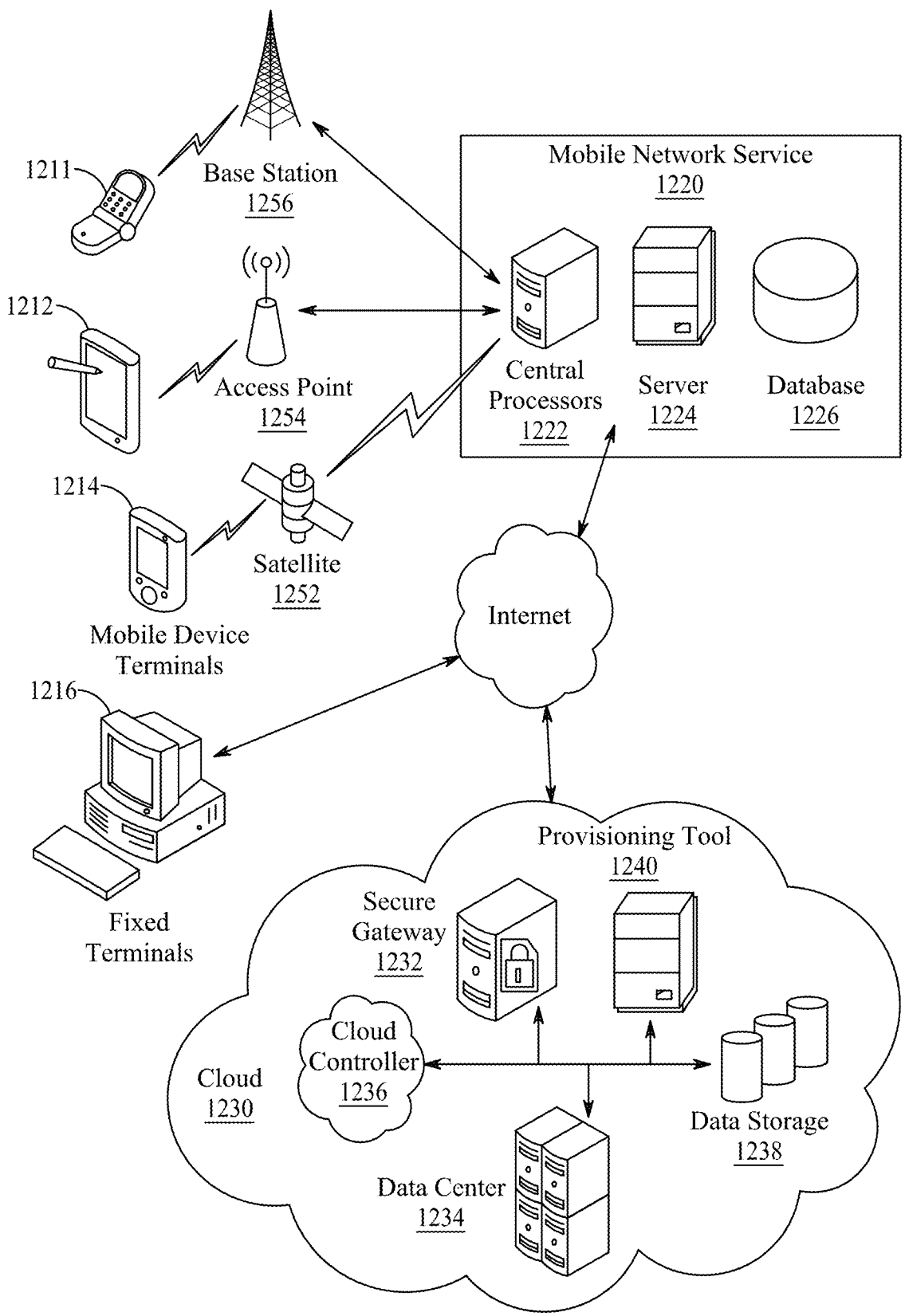
FIG. 12 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 12 illustrates client devices including smart phone 1211, tablet 1212, mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, server 1224 and database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A smart hydroponic vase system, comprising:
    an elongated housing having an open end and a closed end, wherein the open end has a greater diameter than the closed end;
    a plurality of chambers within the elongated housing, the plurality of chambers including at least a first chamber, a second chamber located beneath the first chamber, a third chamber located beneath the second chamber, and a fourth chamber located beneath the third chamber;
    a plurality of submersible pumps, wherein a submersible pump is located in each of the plurality of chambers;
    a plurality of pipes, wherein each pipe connects a different one of the second, the third, and the fourth chamber to the first chamber, wherein each pipe is connected to a respective submersible pump;
    a plurality of measurement sensors located in the first chamber, wherein each measurement sensor is configured to generate measurement signals;
    a plurality of ultrasonic level sensors, wherein each chamber includes an ultrasonic level sensor, wherein each ultrasonic level sensor is configured to measure a level of a respective fluid in said each chamber and generate a level signal;
    a microprocessor attached to an exterior wall of the first chamber, wherein the microprocessor is connected to the plurality of measurement sensors, the plurality of ultrasonic level sensors, and the plurality of submersible pumps, wherein the microprocessor is configured to receive the measurement signals and the level signals and generate drive signals to actuate the plurality of pumps based on the measurement signals and the level signals; and
    a wireless communications unit connected to the microprocessor.

2. The smart hydroponic vase system of claim 1, comprising:
    a cover connected to a mouth of the first chamber;
    a center hole located in the cover, wherein the center hole is configured to support a stem of a plant such that a root system of the plant is within the first chamber and a body of the plant exits the cover through the center hole;
    an air vent located in the cover between the center hole and a perimeter of the cover;
    a first floor located between the first chamber and the second chamber, wherein the first floor is configured to divide the first chamber and the second chamber;
    at least three pipe access holes located in the first floor;
    a first fluid located in the first chamber;
    a wiring aperture located above the first fluid and near the microprocessor, wherein the wiring aperture is configured to pass wiring attached to the plurality of submersible pumps, the plurality of measurement sensors, and the plurality of ultrasonic level sensors to a connection port on the microprocessor;
    a first submersible pump of the plurality of submersible pumps immersed in the first fluid and located on the first floor; and
    a spray nozzle connected to an output port of the first submersible pump, wherein the spray nozzle is configured to spray the first fluid onto the root system.

3. The smart hydroponic vase system of claim 2, wherein the plurality of measurement sensors located in the first chamber include:
    a pH sensor immersed in the first fluid, wherein the pH sensor is configured to measure an acidity of the first fluid;
    a temperature sensor immersed in the first fluid, wherein the temperature sensor is configured to measure a temperature of the first fluid; and
    a humidity sensor located on an interior wall of the first chamber above the first fluid, wherein the humidity sensor is configured to measure a relative humidity based on a content of water vapor in the first chamber.

4. The smart hydroponic vase system of claim 3, further comprising:
    a first ultrasonic level sensor located on an underside of the cover, wherein the first ultrasonic level sensor is configured to measure the level of the first fluid in the first chamber.

5. The smart hydroponic vase system of claim 4, wherein the second chamber includes:
    a second floor located between the second chamber and the third chamber, wherein the second floor is configured to divide the second chamber and the third chamber;
    a second fluid;
    a second submersible pump of the plurality of submersible pumps immersed in the second fluid and located on the second floor;
    a second ultrasonic level sensor located on an underside of the first floor, wherein the second ultrasonic level sensor is configured to measure the level of the second fluid; and
    at least two pipes through holes located in the second floor.

6. The smart hydroponic vase system of claim 5, wherein the third chamber includes:
    a third floor located between the third chamber and the fourth chamber, wherein the third floor is configured to divide the third chamber and the fourth chamber;
    a third fluid;
    a third submersible pump of the plurality of submersible pumps immersed in the third fluid and located on the third floor;
    a third ultrasonic level sensor located on an underside of the third floor, wherein the third ultrasonic level sensor is configured to measure the level of the third fluid; and
    at least one pipe through hole located in the third floor.

7. The smart hydroponic vase system of claim 5, wherein the fourth chamber includes:
    a fourth floor located above a weighted base;
    a fourth fluid;
    a fourth submersible pump of the plurality of submersible pumps immersed in the fourth fluid and located on the fourth floor; and
    a fourth ultrasonic level sensor located on an underside of the third floor, wherein the fourth ultrasonic level sensor is configured to measure the level of the fourth fluid.

8. The smart hydroponic vase system of claim 7, further comprising:
    a first pipe having a first end which extends through a first pipe access hole in the first floor and a second end connected to the second submersible pump, wherein the second submersible pump is configured to pump the second fluid through the first pipe into the first chamber;
    a second pipe having a first end which extends through a second pipe access hole in the first floor and through a first through hole in the second floor, the second pipe having a second end connected to the third submersible pump, wherein the third submersible pump is configured to pump the third fluid through the second pipe into the first chamber;

a third pipe having a first end which extends through a third pipe access hole in the first floor, through a second through hole in the second floor, and through a third through hole in the third floor, the third pipe having a second end connected to the fourth submersible pump, wherein the fourth submersible pump is configured to pump the fourth fluid through the third pipe into the first chamber;

a plurality of access hole seals configured to prevent fluid leakage between each pipe and each corresponding access hole; and a plurality of through hole seals, configured to prevent fluid leakage between each pipe and each corresponding through hole.

9. The smart hydroponic vase system of claim 8, wherein:
the first fluid is a mixture of the second fluid, the third fluid and the fourth fluid;
the second fluid is water;
the third fluid is one of a pH positive fluid and a pH negative fluid; and
the fourth fluid is at least one of a liquid fertilizer and a liquid insecticide.

10. The smart hydroponic vase system of claim 8, further comprising;
a rechargeable battery located within the base, wherein the rechargeable battery is switchably connected by wiring to the microprocessor;
a charging port located on an exterior side of the base, wherein the charging port is connected to the battery; and
a charge sensor connected between the rechargeable battery and the microprocessor, wherein the charge sensor is configured to generate a signal when a charge level of the rechargeable battery falls below a charge threshold.

11. The smart hydroponic vase system of claim 10, further comprising a camera located on an exterior of the elongated housing near the cover, wherein the camera is configured to take images of the body of the plant, wherein wiring from the camera is connected to the microprocessor, and wherein the microprocessor is configured to actuate the camera to take the images and to receive the images from the camera.

12. The smart hydroponic vase system of claim 11, further comprising;
a plant database located in the microprocessor, wherein the plant database includes records relating a genus of the plant, a species of the plant, an age of the plant, plant requirements, and images of plant conditions;
wherein the microprocessor is configured to analyze the measurement signals, and the level signals to determine whether the pH, the temperature, the humidity and the level of the first fluid match the plant requirements;
when the pH, the temperature, the humidity and the level of the first fluid match the plant requirements, actuate the first submersible pump to spray the first fluid onto the root system; and
when the pH, the temperature, the humidity and the level of the first fluid do not match the plant requirements, generate the drive signals to actuate at least one of the second submersible pump, the third submersible pump, and the fourth submersible pump to pump at least one of the second fluid, the third fluid and the fourth fluid into the first chamber.

13. The smart hydroponic vase system of claim 12, wherein the microprocessor is further configured to:
match images of the plant to the images of plant conditions, wherein the plant conditions include images of healthy plants and images of unhealthy plants, wherein the images of unhealthy plants are stored with identification of one of a disease or a parasite infestation; and
generate a state of the plant.

14. The smart hydroponic vase system of claim 13, further comprising;
a memory located in the microprocessor, wherein the memory is configured to store contact information of a manager of the plant;
a GPS unit connected to the microprocessor, the GPS unit configured to generate location coordinates of the smart hydroponic vase system;
wherein the microprocessor is configured to generate a communications packet including the pH level, the temperature level, the humidity level, the level of the first fluid, the level of the second fluid, the level of the third fluid, the level of the fourth fluid, the charge level of the rechargeable battery, the location coordinates, an image of the plant, and the state of the plant; and
wherein the wireless communications unit is configured to transmit the communications packet to the plant manager.

15. The smart hydroponic vase system of claim 14, further comprising;
wherein the wireless communications unit is configured to transmit the genus of the plant and the species of the plant to a wireless access node in communication with a server;
wherein the server is configured to match the genus of the plant and the species of the plant to a record of plant requirements and plant conditions;
wherein the server is configured to transmit the record to the wireless access node;
wherein the wireless access node is configured to transmit the record to the wireless communications unit; and
wherein the microprocessor is configured with instructions to update the plant database with the record.

16. The smart hydroponic vase system of claim 12, further comprising:
a fifth chamber located between a floor of the fourth chamber and the base, wherein the fifth chamber includes a fifth fluid, a fifth submersible pump immersed in the fifth fluid, and a fifth ultrasonic level sensor located on an underside of the floor of the fourth chamber;
a fourth pipe having a first end which extends through a fourth pipe access hole in the first floor, through a third through hole in the second floor, through a second through hole in the third floor, and through a first through hole in the fourth floor, the fifth pipe having a second end connected to the fifth submersible pump, wherein the fifth submersible pump is configured to pump the fifth fluid through the fourth pipe into the first chamber;
wherein:
the first fluid is a mixture of the second fluid, the third fluid, the fourth fluid and the fifth fluid;
the second fluid is water;
the third fluid is one of a pH positive fluid and a pH negative fluid;
the fourth fluid is a liquid fertilizer; and
the fifth fluid is a liquid insecticide.

* * * * *